US006338069B1

(12) United States Patent
Ghatate

(10) Patent No.: US 6,338,069 B1
(45) Date of Patent: Jan. 8, 2002

(54) METHOD AND APPARATUS FOR MANAGING FUNCTIONS

(75) Inventor: Bhalchandra Ghatate, Austin, TX (US)

(73) Assignee: Daman, Inc., Austin, TX (US)

(*) Notice: Subject to any disclaimer, the term of this patent is extended or adjusted under 35 U.S.C. 154(b) by 0 days.

(21) Appl. No.: 09/210,340

(22) Filed: Dec. 11, 1998

(51) Int. Cl.[7] .......................... G06F 17/30
(52) U.S. Cl. .......................... 707/103
(58) Field of Search .......................... 707/103

(56) References Cited

U.S. PATENT DOCUMENTS

| | | | | | |
|---|---|---|---|---|---|
| 5,481,718 | A | * | 1/1996 | Ryu et al. | 709/316 |
| 5,497,491 | A | * | 3/1996 | Mitchell et al. | 395/700 |
| 5,668,958 | A | * | 9/1997 | Bendert et al. | 710/128 |
| 5,717,925 | A | * | 2/1998 | Harper et al. | 707/102 |
| 5,721,911 | A | * | 2/1998 | Ha et al. | 707/100 |
| 5,761,678 | A | * | 6/1998 | Bendert et al. | 707/204 |
| 5,991,768 | A | * | 11/1999 | Sun et al. | 707/104 |
| 6,128,621 | A | * | 10/2000 | Weisz | 707/103 |
| 6,134,559 | A | * | 10/2000 | Brumme et al. | 707/103 |
| 6,195,662 | B1 | * | 2/2001 | Ellis et al. | 707/103 |
| 6,226,628 | B1 | * | 5/2001 | Forbes | 707/1 |
| 6,226,788 | B1 | * | 5/2001 | Schoening et al. | 717/6 |
| 6,253,239 | B1 | * | 6/2001 | Shklar et al. | 709/217 |
| 6,263,313 | B1 | * | 7/2001 | Milsted et al. | 705/1 |

OTHER PUBLICATIONS

Integration Solutions for the Real–Time Enterprise: EIT–Enterprise Integration Template, Template Software (Table of Contents: 1 pg.; Contents: 3–28; Appendix I: 29–30; Appendix II: 31–32).

Object Technology, A Manager's Guide, Second Edition by David A. Taylor, Ph.D., 2/98 (Contents:v–vii; Acknowledgements: ix–x; Introduction: xi–xii; How to Read the Book; xiii–xvi; Chapter 1–9; 1–158; Appendix: 159–175; Suggested Reading: 177–182; Glossary: 183–198; Index: 199–205.

Upstream, A White Paper, Business Process Engines, A New Catagory of Server Software, Will Burst the Barriers in Distributed Application Performance by John Rymer, Upstream Consulting (pp. 1–16; Appendix: 16–19).

ADT Mar. 1997—Viewed as an effective new way to identify core business requirements, business rule thinking A/D is taking shape, Software Engineering (http://ww.adt-mag.com/pub/mar97/softeng. (15 pgs.).

* cited by examiner

*Primary Examiner*—Wayne Amsbury
(74) *Attorney, Agent, or Firm*—Blakely, Sokoloff, Taylor & Zafman, LLP

(57) ABSTRACT

A method and apparatus for managing functions (e.g., that express business rules) to allow calling functions, maintaining functions, and providing of an execution framework for functions. In one embodiment, there are a number of functions to be maintained. An object technology infrastructure is formed to store data and metadata for the functions. For example, metadata about a function can include data describing what that function does, a "cost" associated with that function, how to execute that function, the input and output parameters required by that function. The exposure of the metadata regarding the functions' input and output parameters allows an engine to track input/output relationships between the functions and, in essence, define the order of execution.

46 Claims, 21 Drawing Sheets

| SUBCLASS LABEL | NAME(S) OF INSTANCE(S) |
|---|---|
| RELATIONSHIP CLASS | <NAME1>, <NAME2> ... |
| TRACKING CLASS | |
| PARENT_PARAMETER CLASS | |
| DERIVATIVE CLASS PA | |
| DERIVATIVE CLASS Pi | |
| . . . | |

EXECUTION CLASS 900

- •STRUCTURES
  - •NAME <SAME AS METADATA OBJECT ASSOCIATED WITH>
  - •CLASS_LABEL <LABEL INDICATING A EXECUTION OBJECT>
  - •PARAMS <COLLECTION OF KEY_VALUE OBJECTS>
  - •METADATA_OBJECT_PTR <PTR TO ASSOCIATED METADATA OBJECT>
  - •MANAGER_PTR <PTR TO MANAGER OBJECT OR NULL>
  - •...
- •METHODS
  - •SET_PARAM (<KEY>, <VALUE>)
  - •GET_PARAM (<KEY>; <CONTEXT OBJECT>)
  - •EXECUTE (<MANAGER OBJECT>; <CONTEXT OBJECT>)
  - •PARAMETER_SATISFY (<NEED_COLLECTION>; <EXECUTION OBJECT>; <HAVE>)
  - •...

FIG. 9

CONTEXT CLASS 1100
- •STRUCTURES
  - •NAME
  - •KEY_VALUE_COLLECTION <COLLECTION OF KEY_VALUE OBJECTS>
  - •EXECUTION_COLLECTION <COLLECTION OF EXECUTION OBJECTS>
  - •...
- •METHODS
  - •...

FIG. 11A

MANAGER CLASS 1110
- •STRUCTURES
  - •CONTEXT_COLLECTION <COLLECTION OF CONTEXT OBJECTS>
  - •DEFAULT_CONTEXT <IDENTIFIES ONE OF CONTEXT OBJECTS IN CONTEXT_COLLECTION>
  - •EXECUTION_COLLECTION <COLLECTION OF EXECUTION OBJECTS MANAGED BY A MANAGER OBJECT>
  - •EXECUTION_PATH_COLLECTION <ORDERED COLLECTION OF LEVEL OBJECTS>
  - •...
- •METHODS
  - •NEW_EXECUTION (<NAME OF METADATA OBJECT>; <CLASS_LABEL>; <CONTEXT OBJECT>)
  - •FIND_BY_NAME (<NAME OF METADATA OBJECT>; < CLASS_LABEL >; <CONTEXT OBJECT>)
  - •FIND_BY_NEED (<NEED_COLLECTION (E.G., COLLECTION OF PARAMETER KEYS)>; <HAVE (E.G., CONTEXT OBJECT CONTAINING PARAMETERS HAVE VALUES FOR)>)
  - •FIND_BY_NAME_AND_EXECUTE (<NAME OF METADATA OBJECT>; < CLASS_LABEL >; <CONTEXT OBJECT>)
  - •FIND_BY_NEED_AND _EXECUTE (<NEED_COLLECTION (E.G., COLLECTION OF PARAMETER KEYS)>; <HAVE (E.G., CONTEXT OBJECT CONTAINING PARAMETERS HAVE VALUES FOR)>)
  - •...

FIG. 11B

METHOD AND APPARATUS FOR MANAGING FUNCTIONS

CROSS-REFERENCE TO RELATED APPLICATIONS

Not Applicable.

BACKGROUND OF THE INVENTION

1. Field of the Invention

The invention relates to the field of computer systems. More specifically, the invention relates to function management.

2. Background Information

Most corporate systems built to support certain business practices involve writing application logic within the application. The creator of the application writes the necessary programs in a language of personal desire and adds business specific rules for the application as a part of the module that contains the application. Thus, the business rules of an enterprise have been and are added overtime by different programmers; at different times; using different programming languages; for different applications of an enterprise; etc. This type of application development does not lend itself to maintainable components. Any updates to a business rule might impact the overall application. The application logic is not reusable for other enterprise wide applications, as it is contained within each application. This results in rewriting the same logic for different applications.

Certain other application programmers write the logic specific for the business as a separate module and link to it the other components of the application during execution or during compilation. Even though this allows for reuse of code, the corporations have to maintain a repository of these modules. There is rarely any documentation, much less transfer of knowledge to other departments regarding a module developed in a given department. However, an application developer must know the existence of the modules housing the business rules, as well as how to link them into the application. In addition, the functions in these modules have to be called explicitly. This type of application development does not lend itself to support "call on need" type of functions.

Other applications require the functions representing business rules to match a specified prototype. These functions are accessible through a data structure such as a hash structure (e.g., table, tree, graph, etc.) that contains function pointers. The dynamic selection of functions is supported through the use of a hash function that indexes into the hash structure. There are numerous search types (e.g., search by name, search by type) possible based on the native and complex data structures. This approach has several limitations. For example, additional data structures are required to support each search type. Also, it is difficult to maintain multiple data structures and keep them in sync for any updates/changes. In addition, this approach does not remove the need for extensive documentation and transfer of knowledge for the modules to be re-used.

Furthermore, there is no reasonable mechanism to search a business rule on the basis of its' output. Particularly, each business rule requires inputs and outputs. Before executing a given business rule, a programmer must provide the inputs for that business rule. It can be the case that one or more inputs of a given business rule is an output of a different business rule. Thus, in collecting the inputs for a given business rule, a user may be required to manually identify the collection of business rules whose outputs will provide the inputs for that given business rule. Particularly, a string of business rules, each of whose input is the output of another, may need to be executed to acquire the input needed for the business rule of interest. However, as these business rules are being added to the system, there is no good mechanism or infrastructure to track the input/output relationships between these business rules.

The lack of ability to track the input/output relationships between these business rules makes them difficult, if not impossible, to maintain and/or reuse. Thus, there is no reasonable mechanism by which a user can locate, much less execute, the business rules across the enterprise required to provide the inputs for a given business rule of interest. For example, a user interested in a particular input that is provided by a business rule would need know of that business rule, be able to locate that business rule, and know the format to call that business rule.

Additionally, since the business rules interface with the integration sources and/or other business rules of the enterprise, changing a given integration source and/or business rule can affect any number of other integration sources and/or business rules. However, it often cannot be determined what business rules and/or other integration sources will be affected by such changes. For example, although input/output relationships exists between the business rules, there is no mechanism for readily exposing these relationships. As a result, programmers are reluctant to make any changes, but instead attempt to extend integration sources and/or write new business rules.

BRIEF SUMMARY OF THE INVENTION

A method and apparatus for managing functions (e.g., that express business rules) to allow calling functions, maintaining functions, and providing of an execution framework for functions is described. According to one embodiment of the invention, a machine readable medium is provided having stored thereon a function, a first object, a second object, and an action unit. The function requires a set of one or more input parameters. The first object includes a structure storing a key for each of the input parameters to the function. In addition, the first object includes an action method, which when applied by a processor, causes that processor to invoke the action unit. The second object includes: 1) a first structure to store data for identifying, for one or more of the input parameters, the corresponding key and a value for that input parameter; and 2) a second structure identifying the first object. In addition, the second object includes an execute method, which when applied by a processor, causes that processor to apply the action method. The action unit includes instructions, which when executed by a processor, cause that processor to, access the values in the second object and invoke the function using those values as input parameters.

BRIEF DESCRIPTION OF THE DRAWINGS

The invention may best be understood by referring to the following description and accompanying drawings which are used to illustrate embodiments of the invention. In the drawings:

FIG. 9 is a block diagram illustrating an execution class according to one embodiment of the invention.

FIG. 11A is a block diagram illustrating a context class 1100 according to one embodiment of the invention.

FIG. 11B is a block diagram illustrating a MANAGER class according to one embodiment of the invention.

DETAILED DESCRIPTION OF THE INVENTION

Figure 1A:
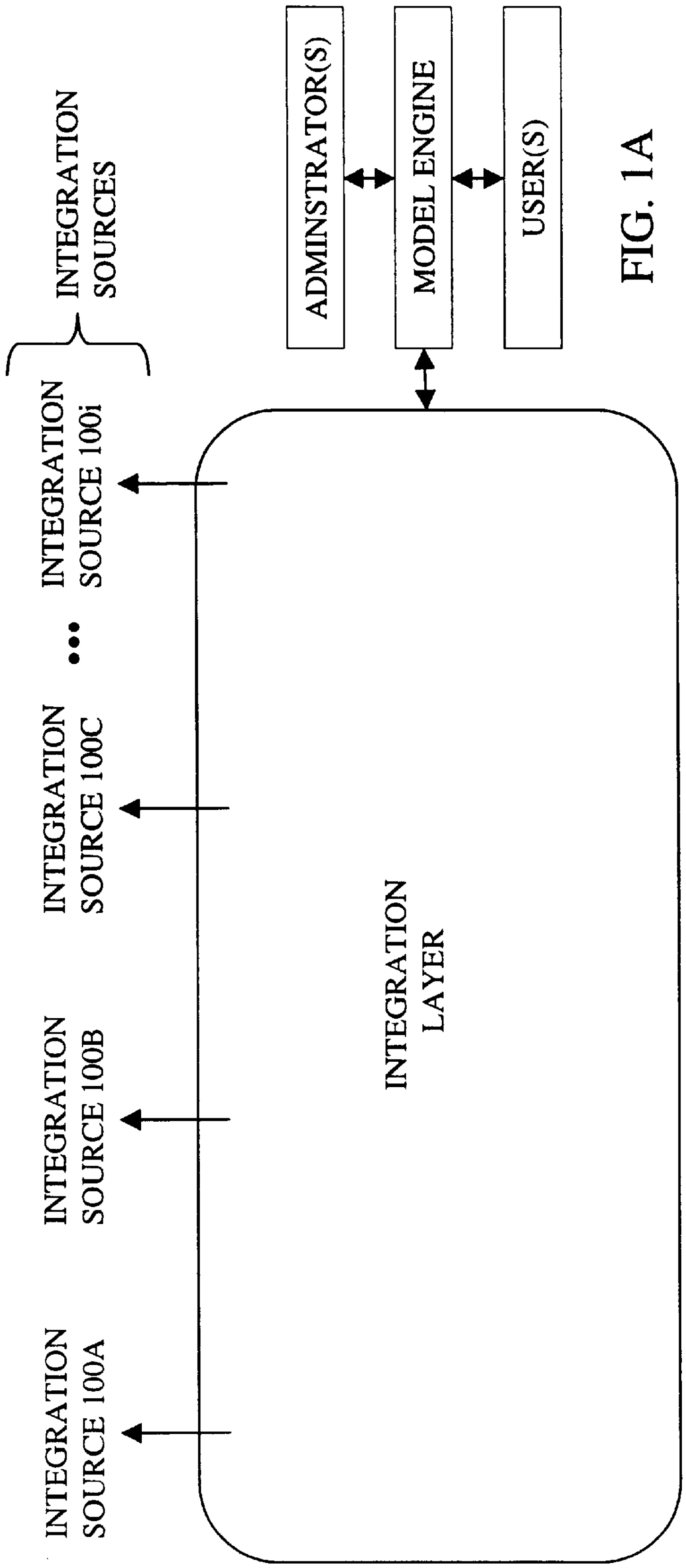
FIG. 1A is a block diagram illustrating a system according to one embodiment of the invention.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Overview

A method and apparatus for managing functions (e.g., that express business rules) to allow calling functions, maintaining functions, and providing of an execution framework for functions is described. In one embodiment, there are a number of functions (e.g., C++ code, set of SQL statements, etc.) to be maintained. An object technology infrastructure is formed to store data and metadata for the functions. The term metadata is used herein to refer to data that describes other data. For example, metadata about a function can include data describing what that function does, a "cost" associated with that function, how to execute that function, the input and output parameters required by that function. The exposure of the metadata regarding the functions' input and output parameters allows an engine to track input/output relationships between the functions and, in essence, define the order of execution. For example, assume there is a function A that requires a Name as the input and that provides an Id as the output, and a function B that requires an Id as the input and that provides a street address as the output. Since the output of function A can satisfy the input of function B, function B depends on function A and function A impacts function B. A relationship is defined within the engine between functions A and B when these functions are added to the system.

This storing of "function metadata" allows the dynamic execution of the function (also referred to as execute on demand). If the engine receives a request (e.g., a request for a set of fields), an execution plan can be created by determining the functions to be processed based on their inputs and outputs identified by the function metadata. Multiple execution trees, plus multiple execution paths within the same tree can be identified to satisfy the request. Based on various parameters, one of the execution paths can be picked.

For example, assume the functions in Table 1 are available. In addition, assume that a user has available a particular name for which that user wants to acquire the associated primary child's name. Accordingly, the functions of Table 1 form a tree (A to B, C and F; from both B and C to D; from D to E; and from F to E) and three execution paths (A→B→D→E, A→C→D→E, and A→F→E) (See FIG. 21). Note that function G is not included in the trees as it is not required to satisfy the request. Thus, function G signifies that the rules are executed only on demand.

TABLE 1

| Function | Input | Output |
|---|---|---|
| A | Name | Id, Best Name |
| B | Id | Street Address |
| C | Best Name | Street Address |
| D | Street Address | Spouse's Name |
| E | Best Name, Spouse's Name | Primary Child's Name |
| F | Id | Spouse's Name |
| G | Best Name | Best Date of Birth |

The above example is a simple query. As queries get more complicated and the number of outputs increase, more and longer trees can be created.

This storing of function metadata also enables impact analysis and maintenance of the functions thereby satisfying the need to consider both (one shot) development and (continual) evolution; that is, integration of functions with adaptiveness during application development and maintenance.

While the concepts described below regarding the managing of functions can be applied to any situation where functions are to be managed, the invention will be described with reference to the management of functions that represent business rules for an enterprise. However, it should be understood that the invention is not limited to the management of functions that represent business rules.

FIG. 1A is a block diagram illustrating a system (e.g., a transactional system, a data warehouse system, etc.) according to one embodiment of the invention. FIG. 1A represents a set of one or more disparate integration sources 100A-i (e.g., relational databases, CORBA, conversion applications, etc.) being used by an exemplary enterprise. In addition, FIG. 1A shows an integration layer formed with object technology providing an integrated view of the enterprise.

FIG. 1A also shows a model engine through which administrator(s) and user(s) can access the integration layer. The model engine is a library of functions that allows for interfacing (e.g., creating, searching, navigating, browsing, manipulating, etc.) with the objects in the integration layer. For example, the administrator(s) can develop and maintain the integration layer, as well as define security access. The user(s), for example, can navigate and/or query the model provided by the integration layer. Thus, the model engine can include various administrator and user interfaces (e.g., business tools, custom front-end tools, custom back-end tools, etc.). Of course, the integration layer and model engine are stored and executed on a computer system (either a single computer or a computer network). Such a computer system stores and communicates (e.g., the model engine and/or integration layer) using machine readable media, such a magnetic disks, optical disks, random access memory, read only memory, carrier waves, signals, etc. As with any method in an object, the code for a given method can be: 1) in the object itself; or 2) stored as part of the model engine and referenced by the object.

As described later herein, the integration layer provides an adaptive integrated view of the enterprise by allowing related items (e.g., functions representing business rules) across the enterprise to be located and applied. Through these interrelationships the result of changing an integration source and/or part of the integration layer can be determined. This ability provides for reusability of existing items and for maintenance of the system.

The integration layer incorporates certain naming standards and procedures. While the integration layer can include various objects (e.g., relationship objects as described later herein), in one embodiment of the invention the integration layer includes action units, metadata objects, execution objects, and one or more manager objects.

Figure 1B:
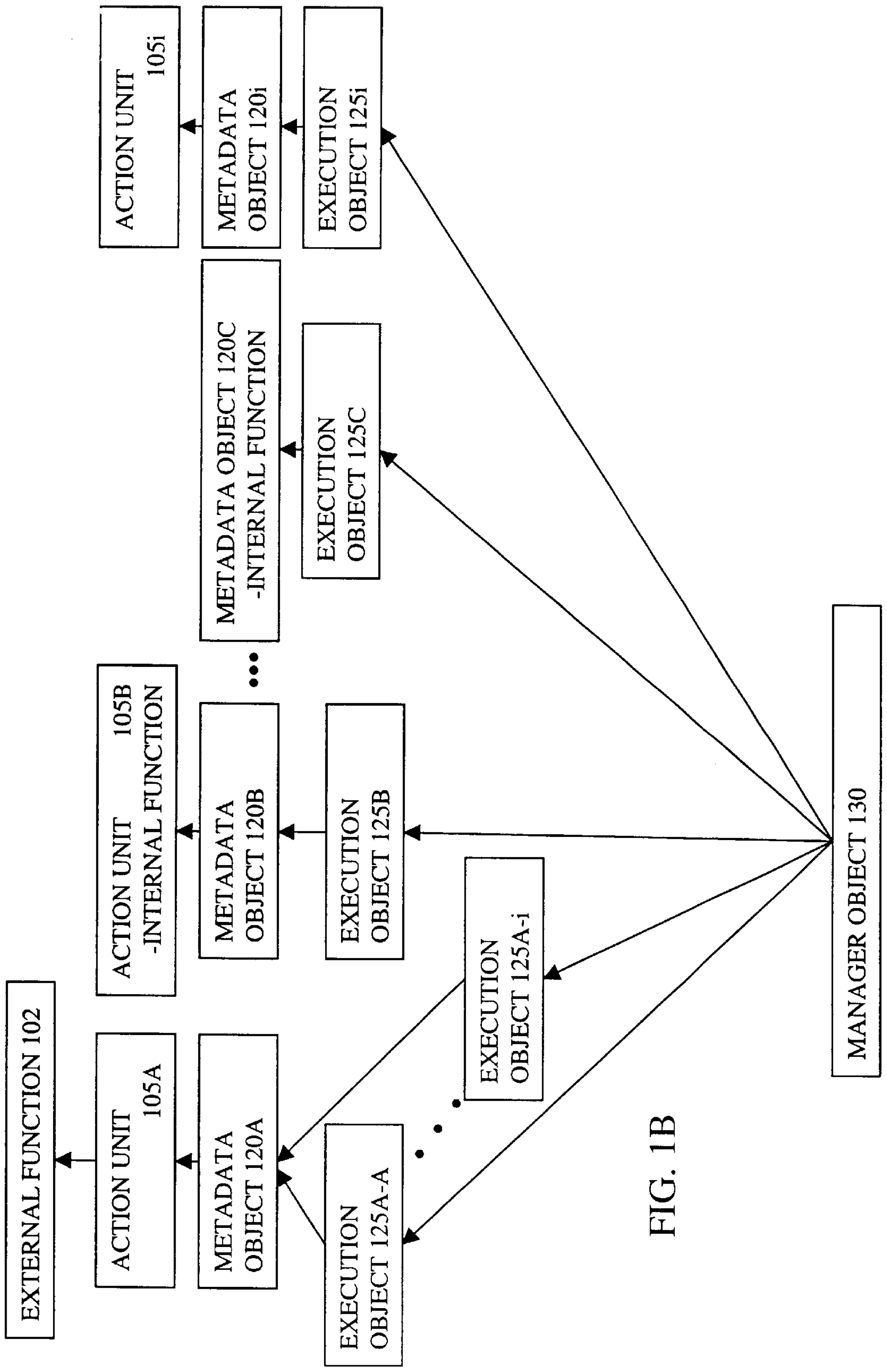
FIG. 1B is a block diagram illustrating the relationship between the functions being tracked, metadata objects, execution objects, and manager objects according to one embodiment of the invention.

FIG. 1B is a block diagram illustrating the relationship between the functions being tracked, metadata objects, execution objects, and manager objects according to one embodiment of the invention. In one embodiment of the invention, there are a number of different functions to be tracked and used. Each of these functions has a set of one or more input parameters and a set of one or more output parameters. The set of objects (metadata, execution, and manager objects) is formed for tracking, as well as providing other functionality, for the number of functions.

For each function, at least one metadata object is formed to store metadata regarding the underlying function. A given metadata object can be associated with an underlying function a number of different ways (e.g., through a reference directly to the function, through a reference to an action unit that provides an interface between the metadata object and its' underlying function, through storage of the function as a method in the metadata object, etc). Any such action units can be implemented in any programming language (e.g., C, C++, JAVA, etc.), and can be used to allow a common signature to be used for all functions.

By way of example, FIG. 1B shows action units 105A-i. Each of the action units 105A-i is associated with a function. For example, the action unit 105A identifies an external function 102 (e.g., legacy code and/or new code from one of the disparate integration sources in FIG. 1A), whereas the action unit 105B contains a function referred to as an internal function.

In addition, FIG. 1B shows metadata objects 120A-i associated with underlying functions. Particularly, metadata objects 120A and B respectfully identify action units 105A and B. Additionally, FIG. 1B shows metadata object 120C directly stores one of the functions (also referred to as an internal function), and therefore does not need an action unit. Among other things, a metadata object can store information describing the input and output "parameter kinds" to it's underlying function. It is worthwhile to note that the term parameter kind is not used herein as synonymous with data type. Rather, the phrase parameter kind refers to a type of information (e.g., name, street address, Id). Thus, two different parameter kinds (e.g., name and street address) may share the same data type (e.g., string).

A metadata object typically does not contain the values to be used as input parameters to the underlying function. Rather, an execution object is formed to maintain a context (e.g., input parameter values and resulting output parameter values) for an underlying function. As such, one or more execution objects may be associated with each METADATA object. FIG. 1B shows EXECUTION objects 125A-x–125i-x. Particularly, FIG. 1B shows EXECUTION objects 125A-A through 125A-I identifying METADATA object 120A, EXECUTION object 125B identifying METADATA object 120B, EXECUTION object 125C identifying METADATA object 120C, and EXECUTION object **125*i* identifying METADATA object 120*i***.

FIG. 1B also shows a manager object 130 identifying each of the execution objects. As described later herein, a manager object can be used, among other things, to track execution objects and store contexts for execution of the underlying functions.

According to this structure, an execution object will maintain a set of input parameter values to be used during execution of an underlying function which is identified through a metadata object. For example, in one embodiment of the invention, an execution object includes a method which, when applied, causes the application of a method in the associated metadata object. The method in the associated metadata object causes the execution of the instructions in the corresponding action unit. Execution of the instructions in the corresponding action unit cause the values for the input/output parameters maintained by the calling execution object to be used during the execution of that action unit's associated function.

The indirection provided by the metadata objects is used to expose metadata regarding the underlying functions. The exposed metadata can include data describing the input and output parameter kinds of the underlying function. As described later herein, the exposed metadata regarding input parameter kinds can be used to identify whether a calling execution object has values for each of the input parameters of the underlying function. Furthermore, if the calling execution object does not have values for the input parameters of the underlying function, the metadata in other metadata objects describing the output kinds of their underlying functions can be used to identify functions that would supply values for the missing input parameters.

While certain aspects of the invention have been described in this overview, the invention is not limited to these aspects and various other aspects of the invention are described later herein. Furthermore, while one embodiment is described with reference to object oriented technology, it is understood that relational table based technology could be used.

Registering Functions with the Integration Layer

Figure 2A:
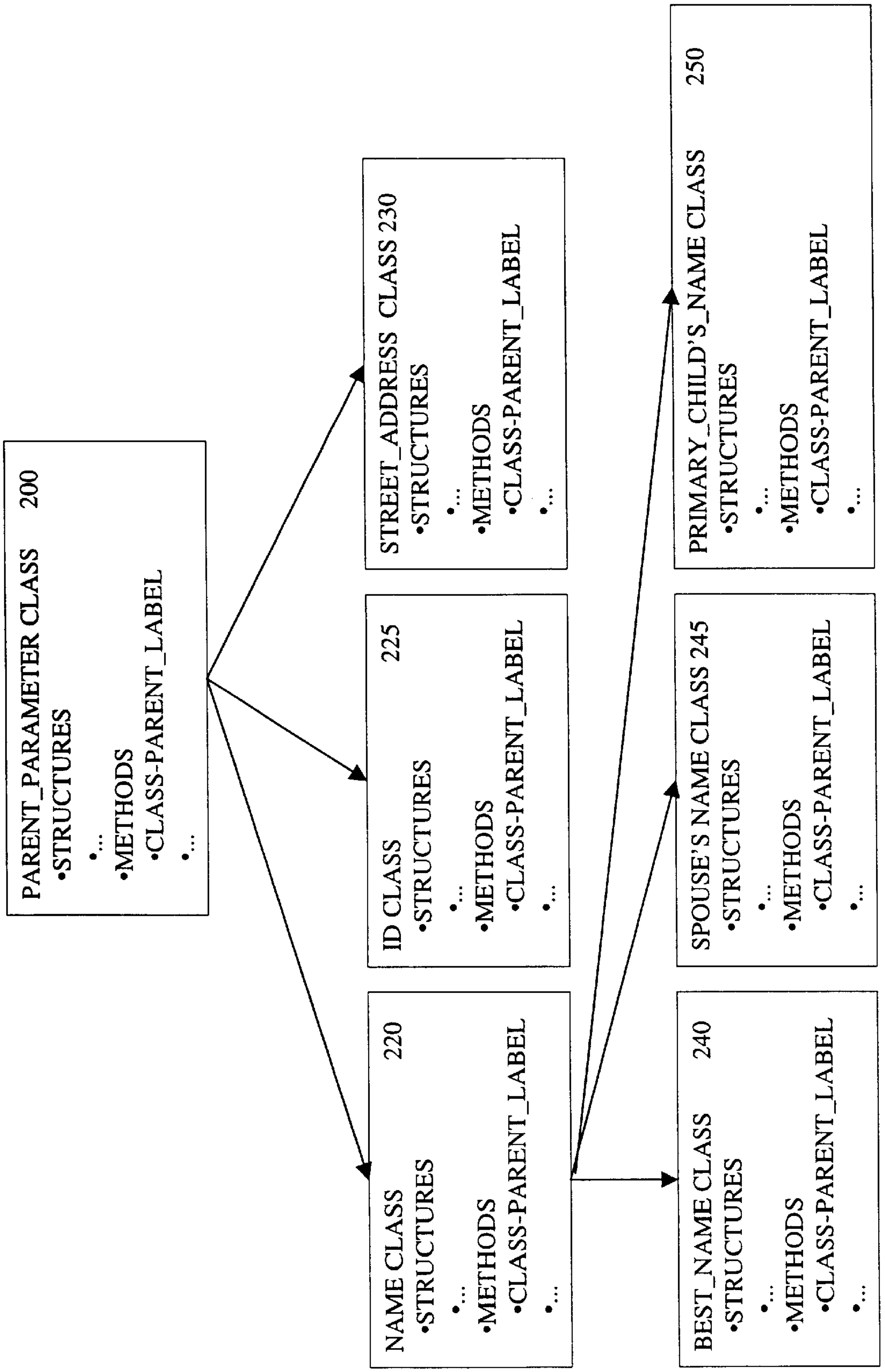
FIG. 2A is a block diagram illustrating an exemplary parameter kind class hierarchy according to one embodiment of the invention.
Figure 2B:
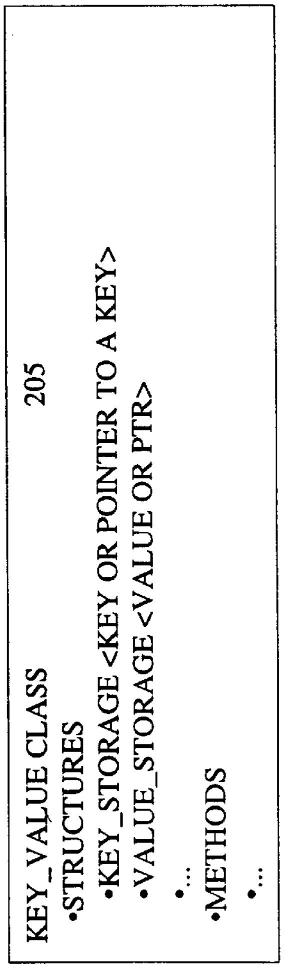
FIG. 2B is a block diagram illustrating a KEY_VALUE class 205 according to one embodiment of the invention.
Figure 2C:
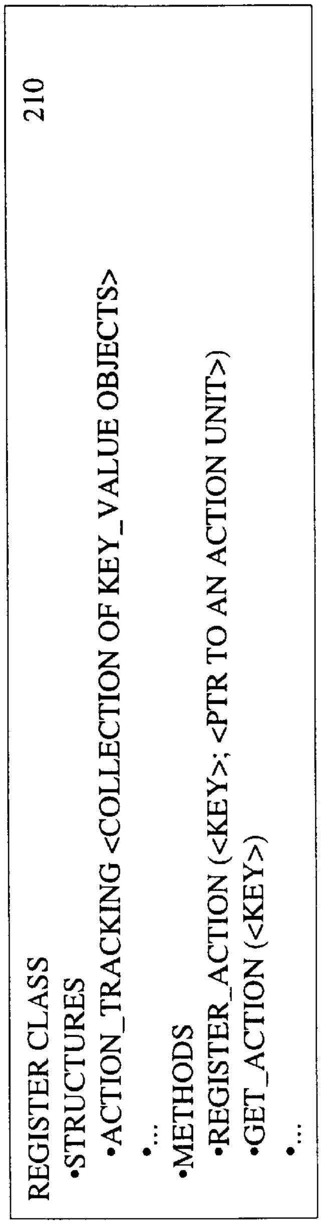
FIG. 2C is a block diagram illustrating a REGISTER class 210 according to one embodiment of the invention.

FIGS. 2A–C are block diagrams illustrating part of an exemplary object oriented infrastructure for the integration layer of FIGS. 1A–B according to one embodiment of the invention. In one embodiment of the invention, keys are used to distinguish amongst the various functions being tracked by the integration layer, as well as providing a naming convention for the input and output parameter kinds of those functions. Thus, a first set of keys is used to distinguish functions being tracked by the integration layer, while a second set of keys is used to distinguish parameter kinds to those functions. Since keys are used for distinguishing both the functions and parameters, the same object oriented classes can be used for both sets of keys.

With regard to the set of keys used to distinguish the parameter kinds, each function being tracked by the integration layer can have one or more input parameters and one or more output parameters. A naming convention is used for the different parameter kinds used by the functions. Different functions may share one or more of the same parameter kinds. To illustrate, consider the previous example where function A has as parameters an Id and a street address, while function B has as parameters an name and a street address. In this example, functions A and B share the street address parameter (they share the same parameter kind). In addition, this example has three parameter kinds (Id, street address, and name).

To provide a conceptual description, assume a mathematical set (a set not containing duplications) containing the parameter kinds of all the functions being tracked by the integration layer. Each of the now unique parameter kinds in the mathematical set is assigned a unique key. As such, there is now a set of unique keys, one key for each parameter kind used by the functions being tracked by the integration layer.

In one embodiment of the invention, a class is formed for each parameter kind and the class name operates as the key for that parameter kind. Furthermore, these parameter kind classes can form a parameter kind class hierarchy. FIG. 2A is a block diagram illustrating an exemplary parameter kind class hierarchy according to one embodiment of the invention. As is well known in the art, classes can be made up of structures and/or methods. The structures can take any form (e.g., link list, array, tree, etc.).

FIG. 2A shows a PARENT_PARAMETER class 200 from which parameter kind classes 220, 225, and 230 are derived. In addition, FIG. 2A shows that parameter kind classes 240, 245, and 250 are derived from parameter kind class 220. Each of the parameter kind classes in FIG. 2A is given a name that operates as the key for that parameter kind. To continue the example from above, the keys assigned the parameter kind classes of FIG. 2A are show in Table 2 (note that the Best Date of Birth is not shown in FIG. 2A for lack of space in the Figure). In other words, the parameter kind class names are used as global labels for identifying the parameter kinds of the functions being tracked by the integration layer.

TABLE 2

| Parameter Kind Class | Name/Key |
|---|---|
| 220 | Name |
| 240 | Best_Name |
| 245 | Spouse's_Name |
| 250 | Primary_Child's_Name |
| 225 | Id |
| 230 | Street_Address |
| | Best_Date_of_Birth |

Each of the parameter kind classes includes a CLASS-PARENT_LABEL method. The CLASS-PARENT_LABEL method is used for associating labels with instances of different classes (similar to the ISA method commonly found in object oriented programming). In one embodiment, the CLASS-PARENT_LABEL method aids in the creation of a set of object tracking structure(s) that provide, among other things, the ability to distinguish which objects in the integration layer are METADATA objects. The operation of the CLASS-PARENT_LABEL method will be described later herein.

FIG. 2B is a block diagram illustrating a KEY_VALUE class 205 according to one embodiment of the invention. In the embodiment shown in FIG. 2A, the KEY_VALUE class includes a KEY_STORAGE structure and a VALUE_STORAGE structure. The KEY_STORAGE structure is used to store a key or a pointer to key (e.g., an instance of a parameter kind class), while the VALUE_STORAGE structure is used to store a current value corresponding to the key stored in the KEY_STORAGE structure. Key value objects are know in the art (e.g., they are used in data structures known as dictionaries).

As stated above, a first set of keys is used to distinguish functions. During operation, certain embodiments use key value objects to track functions. Particularly, a KEY_VALUE object can store the key assigned a function (KEY_STORAGE) and a pointer to that function (VALUE_STORAGE).

As also stated above, a second set of keys is used to distinguish parameter kinds. The KEY_VALUE objects are used to store parameter values for the different parameter kinds. Particularly, if it is desired to store a parameter value, a KEY_OBJECT is formed in which the parameter kind is stored in the KEY_STORAGE structure and the parameter value is stored in the VALUE_STORAGE structure.

FIG. 2C is a block diagram illustrating a REGISTER class 210 according to one embodiment of the invention. The REGISTER class 210 includes an ACTION_TRACKING structure. The ACTION_TRACKING structure is a collection of KEY_VALUE objects. In addition, the REGISTER class includes a REGISTER_ACTION method and a GET_ACTION method. As described below, an instance of the REGISTER class 210 is used for initially tracking the functions.

Figure 3:
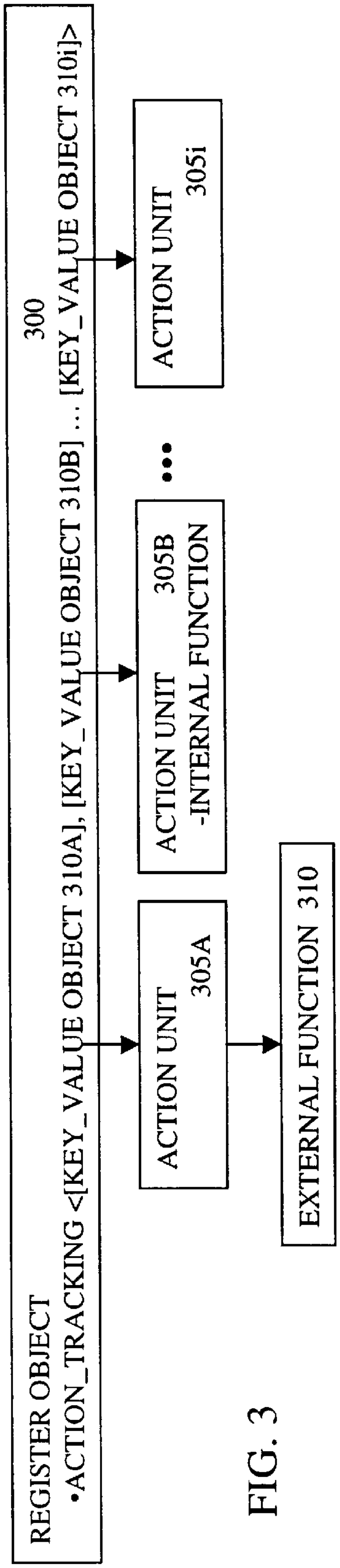
FIG. 3 is a block diagram illustrating the manner in which a register object is used according to one embodiment of the invention.

FIG. 3 is a block diagram illustrating the manner in which a register object is used according to one embodiment of the invention. FIG. 3 shows the action units 305*a–i*. In operation, a given function (whether new or existing) is assigned a key. Next, the REGISTER_ACTION method is applied using as input parameters the function's unique key and a pointer to that function's action unit. Application of the REGISTER_ACTION method causes the creation of a KEY_VALUE object for the function, and storage of that KEY_VALUE object in the ACTION_TRACKING structure of the REGISTER object. By way of example, FIG. 3 illustrates that each of the action units 305*a–i* has a corresponding KEY_VALUE object 310*a–i* stored in the ACTION_TRACKING structure of a register object 300. In this manner, any function (whether internal or external) can be registered with the REGISTER object of the integration layer.

The GET_ACTION method receives as an input parameter the unique key for one of the functions. Application of the GET_ACTION method returns a pointer to the action unit (or metadata object containing an internal function) for the function assigned the input key.

While FIGS. 2A–B and 3 are used herein to describe one mechanism for registering functions with the integration layer, it is understood that various mechanisms can be used for this purpose. In addition, certain figures contained herein illustrate one or more objects stored in a collection (e.g., KEY_VALUE objects 310A–310*i* in the ACTION_TRACKING structure). It is understood that most collections actually store references to the items in the collection, not the item themselves. Thus, the storing of an object in a collection can refer to the storing of a reference to that object in the collection.

Metadata Class

Figure 4:
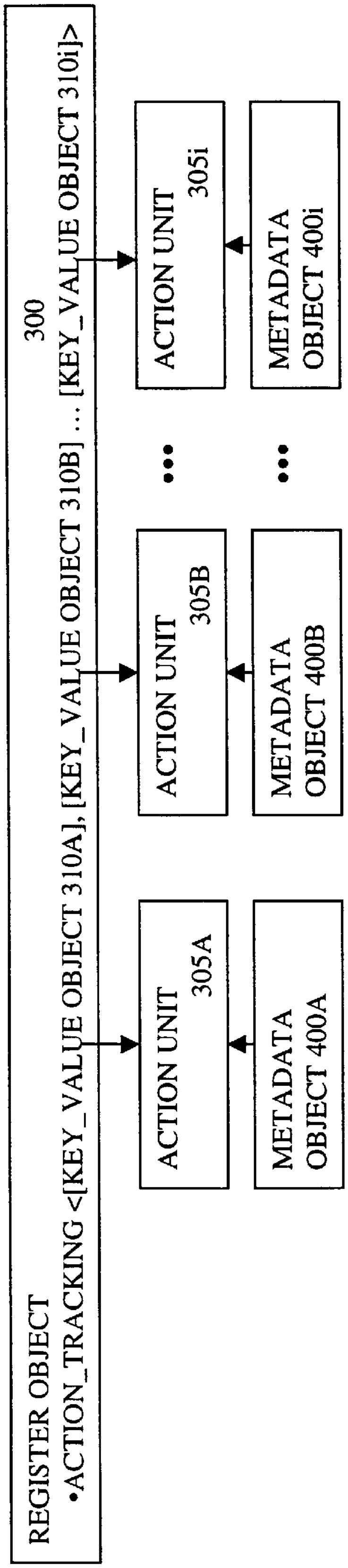
FIG. 4 is a block diagram illustrating the relationship of metadata objects to the action units of FIG. 3 according to one embodiment of the invention.

FIG. 4 is a block diagram illustrating the relationship of metadata objects to the action units of FIG. 3 according to one embodiment of the invention. As previously described, action units can be created for functions tracked by the integration layer, and the functions can be internal or external to the action units. At least one METADATA object is formed for each function, and therefore at least one METADATA object is formed for each action unit. Each METADATA object is used to store metadata regarding the underlying function. In addition, each METADATA object includes one or more methods used to execute the underlying function as described later herein. As such, FIG. 4 shows a number of metadata objects 400A-i. Each of the METADATA objects 400A-i is associated with the one of the action units 305A-i having the matching letter.

Figure 5:
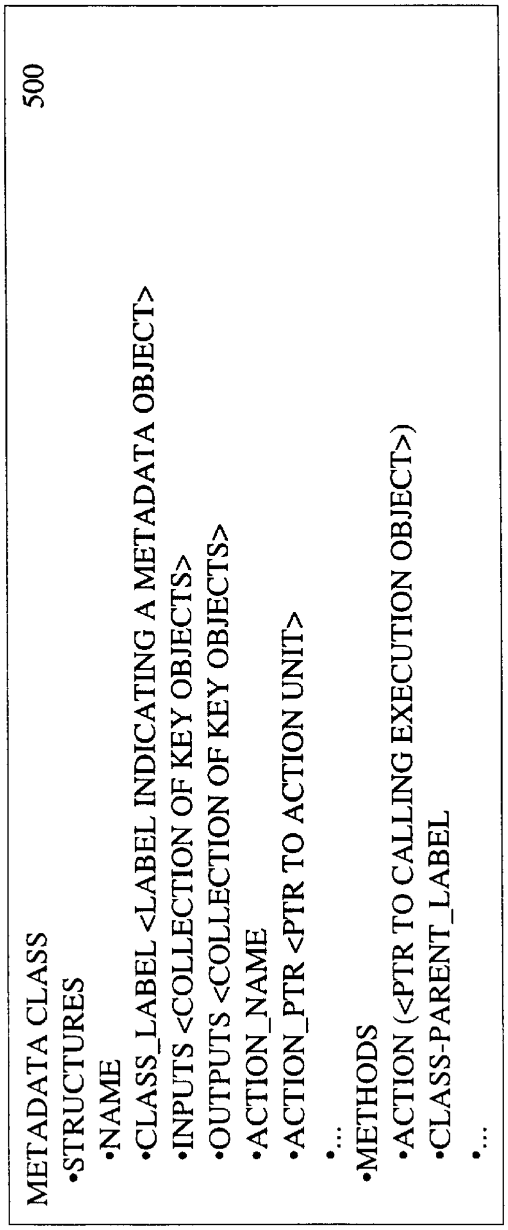
FIG. 5 is a block diagram illustrating a metadata class according to one embodiment of the invention.

FIG. 5 is a block diagram illustrating a metadata class according to one embodiment of the invention. In particular, FIG. 5 shows a METADATA class 500. As with all classes described herein, the METADATA class may include more, less, and/or different structures and/or methods depending on the functionality desired.

The METADATA class 500 includes the following structures: NAME; CLASS_LABEL; INPUTS; OUTPUTS; ACTION_NAME; and ACTION_POINTER. The NAME structure of a metadata object has stored therein the unique key of the function for which that metadata object was created. The CLASS_LABEL structure of all metadata objects stores a label indicating that they are metadata objects. As described later herein, these labels are used by certain embodiments for locating those objects in the integration layer that are metadata objects (and derivatives thereof).

As previously described, each function being tracked by the integration layer can have one or more input parameters and one or more output parameters. The INPUTS structure of a metadata object stores a set of keys identifying the input parameter kinds of the function for which that rule metadata was created. Similarly, the OUTPUTS structure of a metadata object has stored therein a set of keys identifying the output parameter kinds of the function for which that metadata object was created. In this manner, a metadata object contains metadata describing the input and output parameter kinds of the underlying function for which that metadata object was created. As described later herein, this metadata is used to provide different aspects of the invention.

The ACTION_NAME structure is used during creation of a metadata object to store the name of the action unit to which it will eventually be associated. The ACTION_POINTER of a metadata object stores a pointer to the action unit (if any) associated with the function for which that metadata object was created.

The METADATA class also includes an ACTION and a CLASS-PARENT_LABEL methods. When an action unit is used, the ACTION method of a metadata object, when applied, causes the execution of the instructions in the corresponding one of the action units (the action unit identified by the ACTION_PTR structure). However, when a metadata object directly stores an internal function as a method, the action method is overridden with the internal function. The ACTION method receives as an input parameter a pointer to an execution object. The operation of the ACTION method will be described later herein.

As stated above, other types of function metadata can be stored in the metadata object. For example, the storage of metadata describing what a function does can be searched to allow users to interact more easily with the system. The storage of metadata describing a cost of a function is used in certain embodiments as described later herein to select between execution paths described above and later herein. The storage of metadata describing how to execute the underlying function can be used to provide the user with information needed to set up an execution environment for that function. In certain embodiments, metadata (e.g., text) describing what each parameter is used for (what that parameter means) is stored (e.g., the key stored is Best_Name, while the description of what that parameter is used for might be "A parameter used to store the spelling that occurs most often for an input name.") The storage of this text description regarding the parameters can be searched and/or read to allow users to interact more easily with the system.

As stated above, certain embodiments use a set of object tracking structure(s) to track certain of the classes of objects (including the METADATA objects) in the integration layer. The object tracking structure(s) can take a variety of forms and be created in a variety of different ways. FIGS. 6A–8 are used herein to describe one such mechanism. However, it is understood that the invention is not limited to the mechanisms described with reference to FIGS. 6A–8. Particularly, alternative embodiments could use indexes.

Figure 6A:
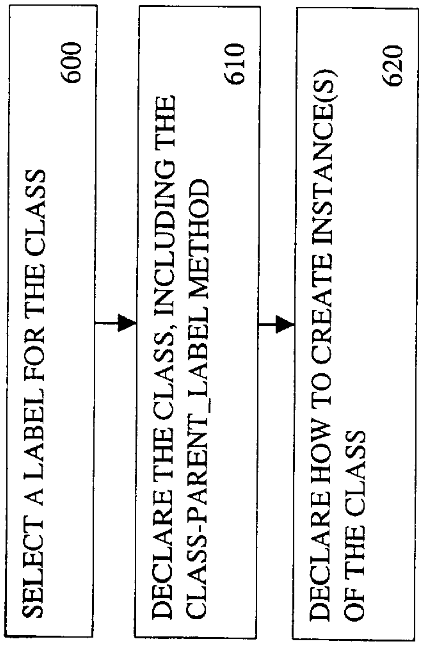
FIG. 6A is a flow diagram illustrating the definition of a class and instances of that class according to one embodiment of the invention.

FIG. 6A is a flow diagram illustrating the definition of a class and instances of that class according to one embodiment of the invention. In one embodiment of the invention, it is contemplated that different programmers will be creating functions and objects at different times and/or for different integration sources. As a result, different programmers that are not in direct communication (e.g. they are working at different times, they are working on different projects, etc.) will be adding functions and classes. For this and other reasons, it is desirable to have a set of central structure(s) for tracking the objects of the integration layer. To this end, one or more object tracking structures are created. While any number of different object tracking structures could be used, a few examples of object tracking structures are given herein. For example, in one embodiment of the invention a class label structure, a class hierarchy structure, and an instances structure are used. These exemplary structures will be described in more detail below.

In block 600, a unique label for the class is created and control passes to block 610. When a programmer wishes to create a class, the programmer first creates a label that is not being used. With reference to the exemplary object tracking structures mentioned above, the class label structure is a centralized repository for the programmers to store labels currently being used to distinguish the different classes. In block 600, a given programmer and/or programming tool accesses the class label structure to select a class label that is not already being used. When the programmer identifies a label that is not currently being used, the programmer adds this label to the class label structure.

As shown in block 610, the class is declared and control passes to block 620. Since the general manner of defining a class is well known, only those parts relevant to this discussion will be described. In particular, assuming that the class of FIG. 5 is used, the programmer and/or programming tool will need to specify an overriding CLASS-PARENT_LABEL method. The CLASS-PARENT_LABEL method is written to output the label for the class (selected in block 600) and the label of the parent class of that class (if any). Since the class is being defined, the parent for the class (if any) will be readily identifiable. As such, the label for the parent of the class can so be identified and incorporated in the CLASS-PARENT_LABEL method. As described later herein, the CLASS-PARENT_LABEL method will be used during class initialization and instances initialization to update the object tracking structures.

As shown in block 620, the manner of creating instance(s) of the class is declared. In one embodiment of the invention, the objects in the integration layer include INIT and INITIALIZE_INSTANCES methods. The INIT methods for the classes are all applied at runtime to perform class initialization as described with reference to FIG. 6B, while the INITIALIZE_INSTANCES methods are applied during instance initialization as described with reference to FIG. 6C.

Figure 6B:
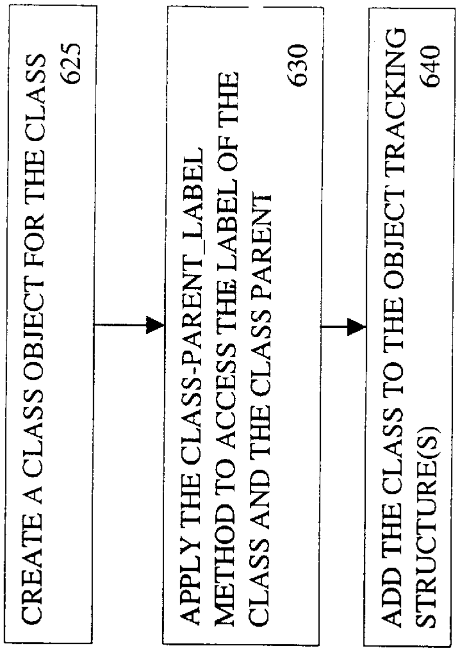
FIG. 6B is a flow diagram illustrating certain aspects of the initialization of a class according to one embodiment of the invention.

FIG. 6B is a flow diagram illustrating certain aspects of the initialization of a class according to one embodiment of the invention. In block 625, an instance of the class is created (referred to herein as the class object) and control passes to block 630.

In block 630, the CLASS-PARENT_LABEL method of the class object is applied to identity the label of the class and the label of its' parent (if any). From block 630, control passes to block 640.

Figures 7, 8:
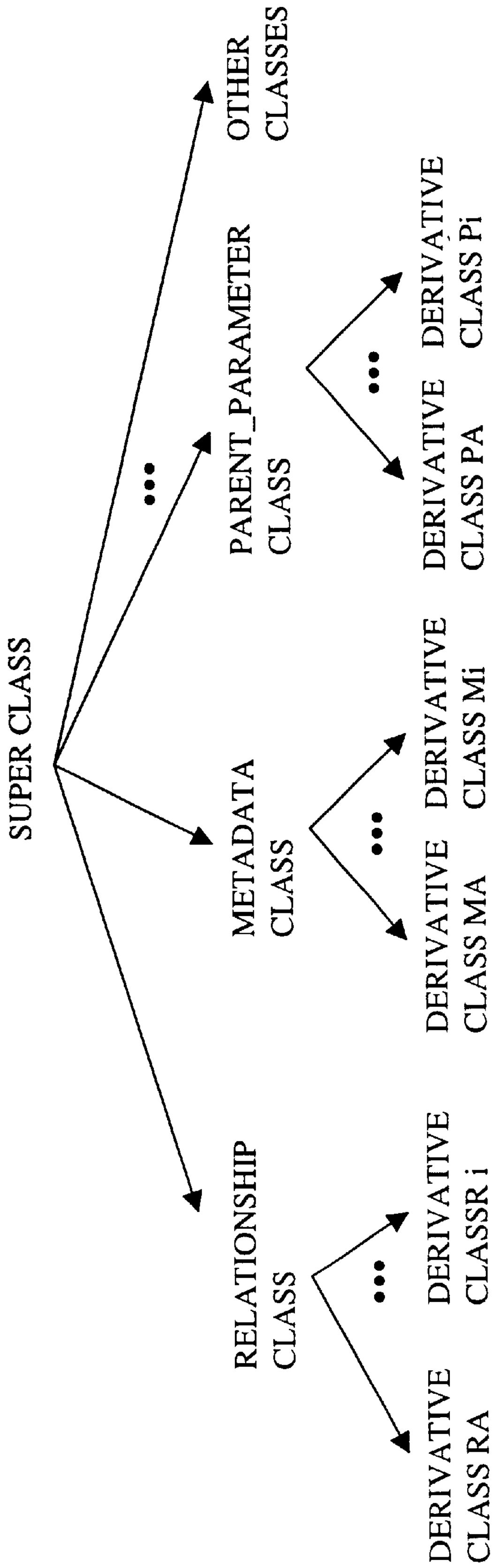
FIG. 7 is a conceptual diagram illustrating an exemplary class hierarchy structure according to one embodiment of the invention.
FIG. 8 is a conceptual diagram illustrating the instances structure according to one embodiment of the invention.

As shown in block 640 of FIG. 6B, the class being initialized is added to the object tracking structure(s). To continue the description of the exemplary object tracking structure(s), FIG. 7 is a conceptual diagram illustrating an exemplary class hierarchy structure according to one embodiment of the invention. As shown in FIG. 7, the class hierarchy structure expresses in some form a top-down representation of the hierarchy of the classes with reference to the class labels. During block 630 of FIG. 6B, the parent label identified by the CLASS-PARENT_LABEL method is used to identify the position of the parent class in the class hierarchy structure. Subsequently, the class label is added to the class hierarchy structure in the appropriate manner to identify its relationship to the parent.

In addition to adding the class to the class hierarchy structure, the class label is also added to the instances structure. FIG. 8 is a conceptual diagram illustrating the instances structure according to one embodiment of the invention. The instances structure is a central repository used to record all of the instances by class. As shown in FIG. 8, each class label and the instances of that class are stored in the instances structure. While any number of well known techniques can be used for implementing the instances structure, one embodiment of the invention uses a hash dictionary. In addition, one embodiment of the invention uses numbers as the labels for the classes, but associates more descriptive labels with these number labels using features of a programming language.

The combination of the class hierarchy structure and the instances structure provides a mechanism by which all instances of a class (e.g., the metadata class, the parent parameter class, etc.) and its derivatives (if any) can be identified. As previously described, alternative embodiments can use different structures. For example, rather than using the CLASS-PARENT_LABEL method, data identifying the labels of a class and of its' parent could be expressed as data in a structure of the class. As another example, rather than generating the class hierarchy and/or instances structure during class and instance initialization, alternative embodiments require the class hierarchy and/or instances structures be maintained by the programmers during the definition of the class(es) and instance(s). As another example, rather than having a class label structure, a class hierarchy structure, and an instances structure, an alternative embodiment could combine one or more of these into one structure. As another example, rather than using structure(s) that track all class and instances of the integration layer, an alternative embodiment could implement structures that track only certain classes and/or instances. As another example, rather than implementing a class hierarchy structure, an exhaustive search using the bottom-up view of the class hierarchy provided by the CLASS-PARENT_LABEL methods can be used to locate class(es) and any derivatives thereof.

Figure 6C:
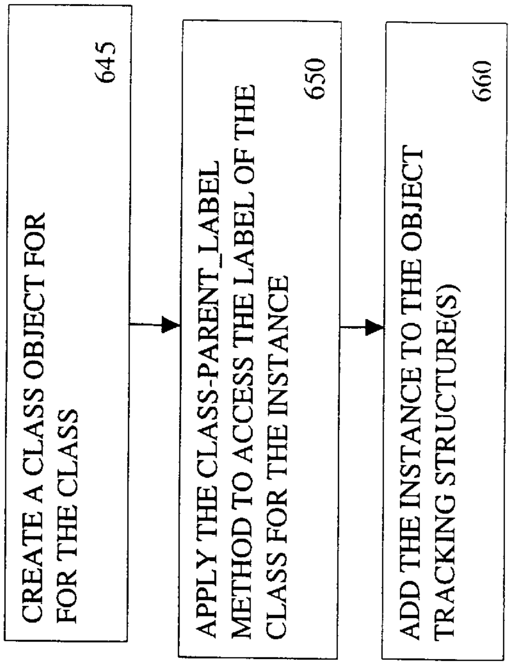
FIG. 6C is a flow diagram illustrating the initialization of an instance of a class according to one embodiment of the invention.

FIG. 6C is a flow diagram illustrating the initialization of an instance of a class according to one embodiment of the invention. For example, in the embodiment described above the INITIALIZE_INSTANCES method is applied to create the instance. In block 645, an instance of the class is created and control passes to block 650.

With reference to block 650 of FIG. 6C, the CLASS-PARENT_LABEL method of the instance is applied to identify the label of the class. Block 650 is performed in the same manner as block 625. From block 650, control passes to block 660.

In block 660, the instance is added to the object tracking structure(s). To continue the description of the exemplary object tracking structure(s), the label identified in block 650 is used to locate the instance's class in the instances structure. The name of the new instance is then added to the instances structure under that class label.

Execution Class

FIG. 9 is a block diagram illustrating an execution class according to one embodiment of the invention. As previously described, an execution object is used to maintain a context for executing the underlying function.

The EXECUTION class 900 of FIG. 9 includes the following structures: NAME; CLASS LABEL; PARAMS; METADATA_OBJECT_PTR; and MANAGER_PTR. As previously described, each execution object is associated with a metadata object. In one embodiment, the NAME structure of an execution object contains the same data as the name structure of the METADATA object to which it is associated. In alternative embodiments, the NAME structure need not store the same data, but rather a name to name look-up structure is used. The CLASS_LABEL structure of the EXECUTION class 900 is used for the same purpose as the CLASS_LABEL structure of the METADATA class.

The PARAMS structure of an execution object is used to store a context for executing that execution object's underlying function. The PARAMS structure of a given execution object is used to store a KEY_VALUE object associated with each input and output parameter of the underlying function. A KEY_VALUE object associated with a given parameter stores the key for that parameter kind and the value to be used as previously described. An example of the PARAMS structure is later described herein with reference to FIG. 10.

The METADATA_OBJECT_PTR structure is used for storing a pointer to the METADATA object for which that EXECUTION object was created. The MANAGER_PTR structure of an execution object is used to store a pointer to a MANAGER object (if any).

The EXECUTION class 900 also includes the following methods: SET_PARAM; GET_PARAM; EXECUTE; and PARAMETER_SATISFY. While each of these methods is further described later herein, a brief description of each is provided here. Application of the SET_PARAM method sets the value of a KEY_VALUE object associated with that execution object. As later described herein with reference to one embodiment of the invention, this KEY_VALUE object may be stored as part of the PARAMS structure or as a part of a context provided by a MANAGER object.

Application of the GET_PARAM method returns a value associated with a parameter kind whose key is supplied as an input (e.g., from the PARAMS structure). Application of the EXECUTE method causes the application of the action method from the metadata object identified by the METADATA_OBJECT_PTR. The PARAMETER_SATISFY method returns values for parameter kinds whose keys are supplied as inputs.

Figure 10:
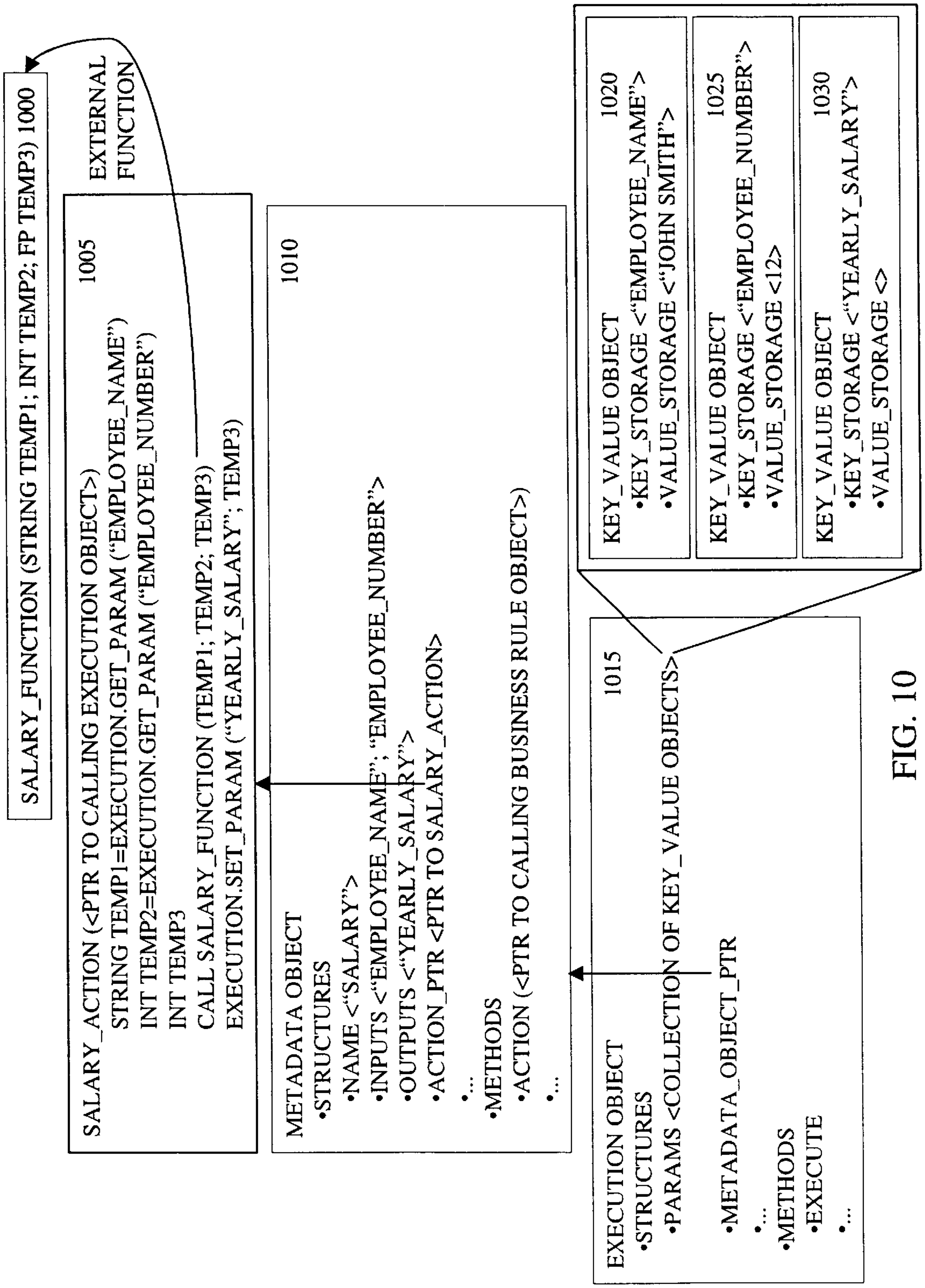
FIG. 10 is an exemplary block diagram illustrating the relationship between an execution object and its' underlying function.

FIG. 10 is an exemplary block diagram illustrating the relationship between an execution object and its' underlying function. FIG. 10 shows an external function SALARY_FUNCTION 1000, an action unit SALARY_ACTION 1005, a METADATA object 1010, and an execution object 1015.

The SALARY_FUNCTION is written to receive an employee's name and an employee's number, and to produce that employee's yearly salary. As such, the SALARY_FUNCTION has for inputs: 1) a string labeled TEMP1 for the employee's name; and 2) an integer labeled TEMP2 for the employee's employee number. In addition, the salary function provides a floating point output in TEMP3 for the yearly salary. As previously described, the input and output parameter kinds of every function (including the SALARY_FUNCTION) are assigned a unique key. In the example of FIG. 10, the unique keys are "EMPLOYEE_NAME," "EMPLOYEE_NUMBER," and "YEARLY_SALARY." As also previously described, a METADATA object stores metadata regarding the underlying function. As such, the METADATA object 1010: 1) stores in its INPUTS structure the keys "EMPLOYEE_NAME" and "EMPLOYEE_NUMBER" (e.g., pointers to the class objects for the parameter kind classes with these names); 2) stores in its OUTPUTS structure the key "YEARLY_SALARY;" and 3) stores in the ACTION_PTR structure a pointer to the SALARY_ACTION 1005.

Accordingly, the EXECUTION object 1015 stores in its PARAMS structure a key value object for the EMPLOYEE_NAME and EMPLOYER_NUMBER parameter kinds (KEY_VALUE objects 1020 and 1025). The KEY_VALUE objects 1020 and 1025 respectively have stored in their KEY_STORAGE structures the unique keys EMPLOYEE_NAME and EMPLOYEE_NUMBER. The METADATA_OBJECT_PTR of the EXECUTION object 1015 stores a pointer to the METADATA object 1010.

By way of example, assume the EXECUTE method of the EXECUTION object 1015 is applied. Responsive to application of this execute method, the METADATA_OBJECT_PTR of the EXECUTION object 1015 is used to apply the ACTION method of the METADATA object 1010. The ACTION method has as an input parameter a pointer to the calling execution object (EXECUTION object 1015). Application of the ACTION method causes the execution of the instructions in the SALARY_ACTION 1005. Thus, the SALARY_ACTION 1005 receives the pointer to the calling execution object (in this example, the EXECUTION object 1015).

Execution of the SALARY_ACTION unit 1005 causes the following: 1) a variable TEMP1 to be declared and set to the value stored in the VALUE_STORAGE structure of the KEY_VALUE object 1020; 2) a variable TEMP2 be declared and set to the value contained in the VALUE_STORAGE structure of the KEY_VALUE object 1025; and 3) declaration of a variable TEMP3. In addition, the instructions of the SALARY_ACTION unit 1005 cause the SALARY_FUNCTION 1000 to be called using: 1) TEMP1 and TEMP2 as input parameters; and 2) TEMP3 as a storage area for the output parameter. As such, the values for the input parameters for the SALARY_FUNCTION 1000 have been read from the EXECUTION object 1015.

Additionally, execution of the instructions in the SALARY_ACTION unit 1005 result in storing the value associated with TEMP3 in the VALUE_STORAGE structure of the KEY_VALUE object 1030. As such, the outputs of the SALARY_FUNCTION are stored in the EXECUTION object.

Manager Class

FIGS. 11A–B are block diagrams illustrating two additional classes of the integration layer of FIG. 1A according to one embodiment of the invention. FIG. 11A is a block diagram illustrating a context class 1100 according to one embodiment of the invention. The context class includes the following structures: NAME; KEY_VALUE_COLLECTION; and EXECUTION_COLLECTION.

The NAME structure of a context object is used to store a name or label for that context object. The KEY_VALUE_COLLECTION of the context class 1100 is used to store a collection of KEY_VALUE objects. In particular, the KEY_VALUE_COLLECTION is used to store KEY_VALUE objects that associate values with parameter kinds of functions (similar to the PARAMS structure). The EXECUTION_COLLECTION structure of the context class 1100 is used to store a collection of EXECUTION objects. Each context object can be used for storing a different context for executing and searching functions being tracked by the integration layer. The manner of using the context objects will be further described later herein.

In one embodiment, the KEY_VALUE_COLLECTION structure is formed for efficiency purposes. Particularly, the EXECUTION_COLLECTION structure stores the execution object(s) for the context. The KEY_VALUE objects for that context are therefore stored in the PARAMS structure of those EXECUTION objects. The system stores the KEY_VALUE objects from those PARAMS structures in the KEY_VALUE_COLLECTION structure to provide for more efficient processing. In an alternative embodiment, the KEY_VALUE_COLLECTION structure is not implemented.

FIG. 11B is a block diagram illustrating a MANAGER class according to one embodiment of the invention. A manager object can be used for managing the execution objects. The MANAGER class 1110 includes the following structures: CONTEXT_COLLECTION; DEFAULT_CONTEXT; EXECUTION_COLLECTION; and EXECUTION_PATH_COLLECTION.

The CONTEXT_COLLECTION structure is used for storing a collection of context objects. Thus, the CONTEXT_COLLECTION structure can be used for storing various contexts to be used when executing and searching different functions being tracked by the integration layer. The DEFAULT_CONTEXT structure is used to store data identifying one of the context objects stored in the CONTEXT_COLLECTION structure as the default context. The EXECUTION_COLLECTION is used to store a collection of execution objects managed by a MANAGER object.

In one embodiment, the EXECUTION_COLLECTION structure in the manager class is provided for efficiency purposes. Particularly, the execution objects for the manger object are stored in the context objects of the CONTEXT_COLLECTION structure. The system associates those execution objects with the EXECUTION_COLLECTION structure to provide for more efficient processing. In an alternative embodiment, the EXECUTION_COLLECTION structure is not implemented as part of the manager class.

The MANAGER class 1110 includes the following methods: NEW_EXECUTION; FIND_BY_NAME; FIND_BY_NEED; FIND_BY_NAME_AND_EXECUTE; and FIND_BY_NEED_AND_EXECUTE. Although each of the methods is described in further detail later herein, a quick overview is provided here.

The NEW_EXECUTION method is used to create a new execution object. The FIND_BY_NAME method is used to locate or create an execution object for a given function tracked by the integration layer. The FIND_BY_NEED method requires as an input parameter a collection of parameter kinds for which output values are requested (referred to herein as needs). The FIND_BY_NEED method returns a collection of EXECUTION objects whose underlying functions return as outputs the specified needs. The FIND_BY_NAME_AND_EXECUTE and the FIND_BY_NEED_AND_EXECUTE methods add the additional steps of applying the EXECUTE method from the returned EXECUTION objects.

Figure 12:
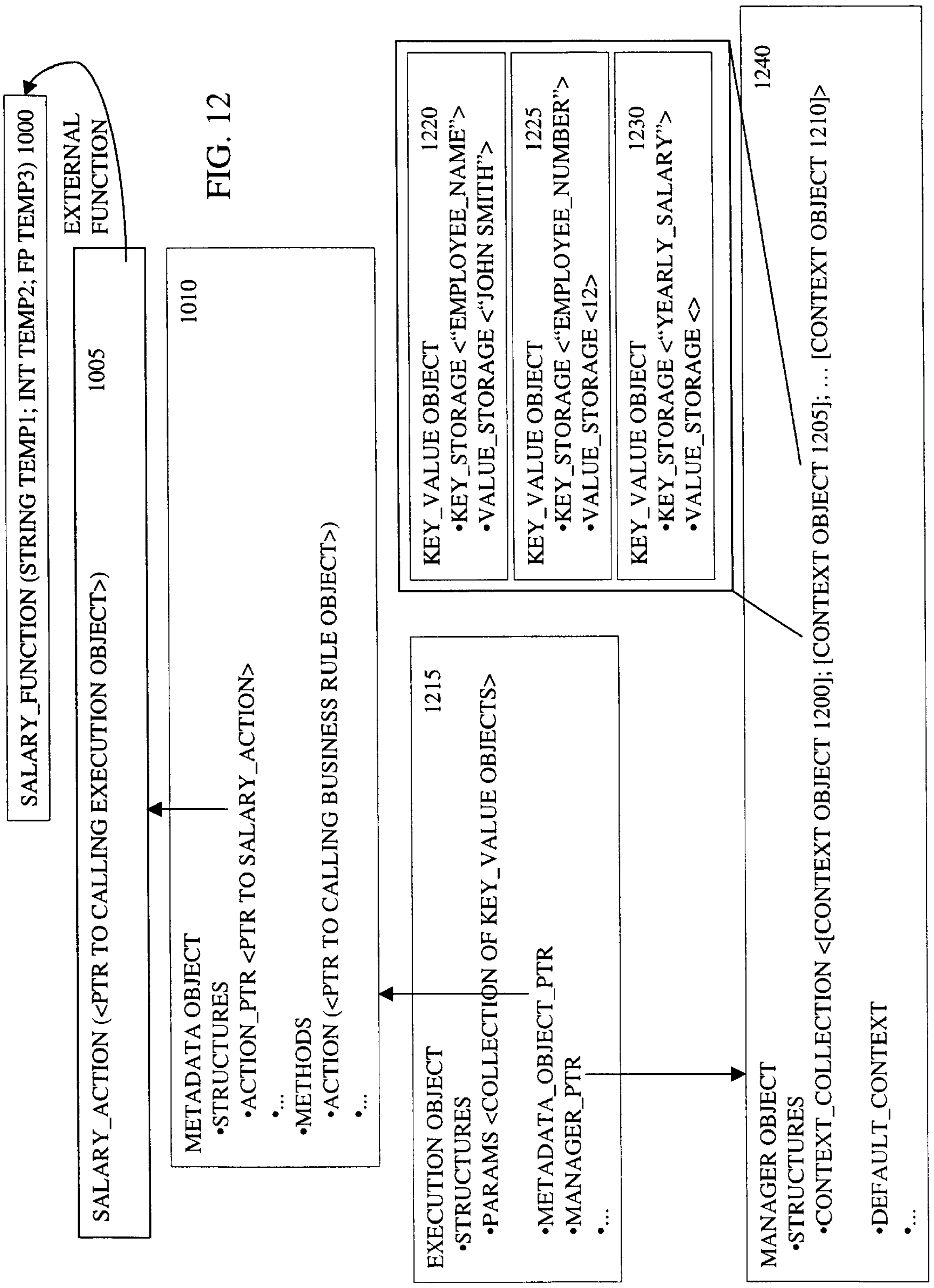
FIG. 12 is a block diagram illustrating an example in which the parameters for the underlying function are contained within a manager object according to one embodiment of the invention.

FIG. 12 is a block diagram illustrating an example in which the parameters for the underlying function are contained within a manager object according to one embodiment of the invention. FIG. 12 contains the SALARY_FUNCTION 1000, the SALARY_ACTION 1005, and the METADATA object 1010 from FIG. 10. In contrast to FIG. 10, FIG. 12 shows an execution object 1215. The METADATA_OBJECT_PTR of the EXECUTION object 1215 stores a pointer to the METADATA object 1010. The MANAGER pointer of the EXECUTION object 1215 stores a pointer to a MANAGER object 1240.

The CONTEXT_COLLECTION structure of the MANAGER object 1240 includes context objects 1200, 1205, and 1210. The context object 1205 includes KEY_VALUE objects 1220, 1225, and 1230. As previously mentioned and as later described herein, application of the EXECUTE method of the EXECUTION object 1215 causes the execution of the instructions in the SALARY_ACTION unit 1005. In contrast to FIG. 10, execution of the instructions in the SALARY_ACTION unit 1005 results in the TEMP1 and TEMP2 variables being set to the values stored in the VALUE_STORAGE structures of the KEY_VALUE objects 1220 and 1225. Furthermore, the return output from the SALARY_FUNCTION 1000 is stored back into the VALUE_STORAGE structure of the KEY_VALUE object 1230.

SET_PARAM Method

Figure 13:
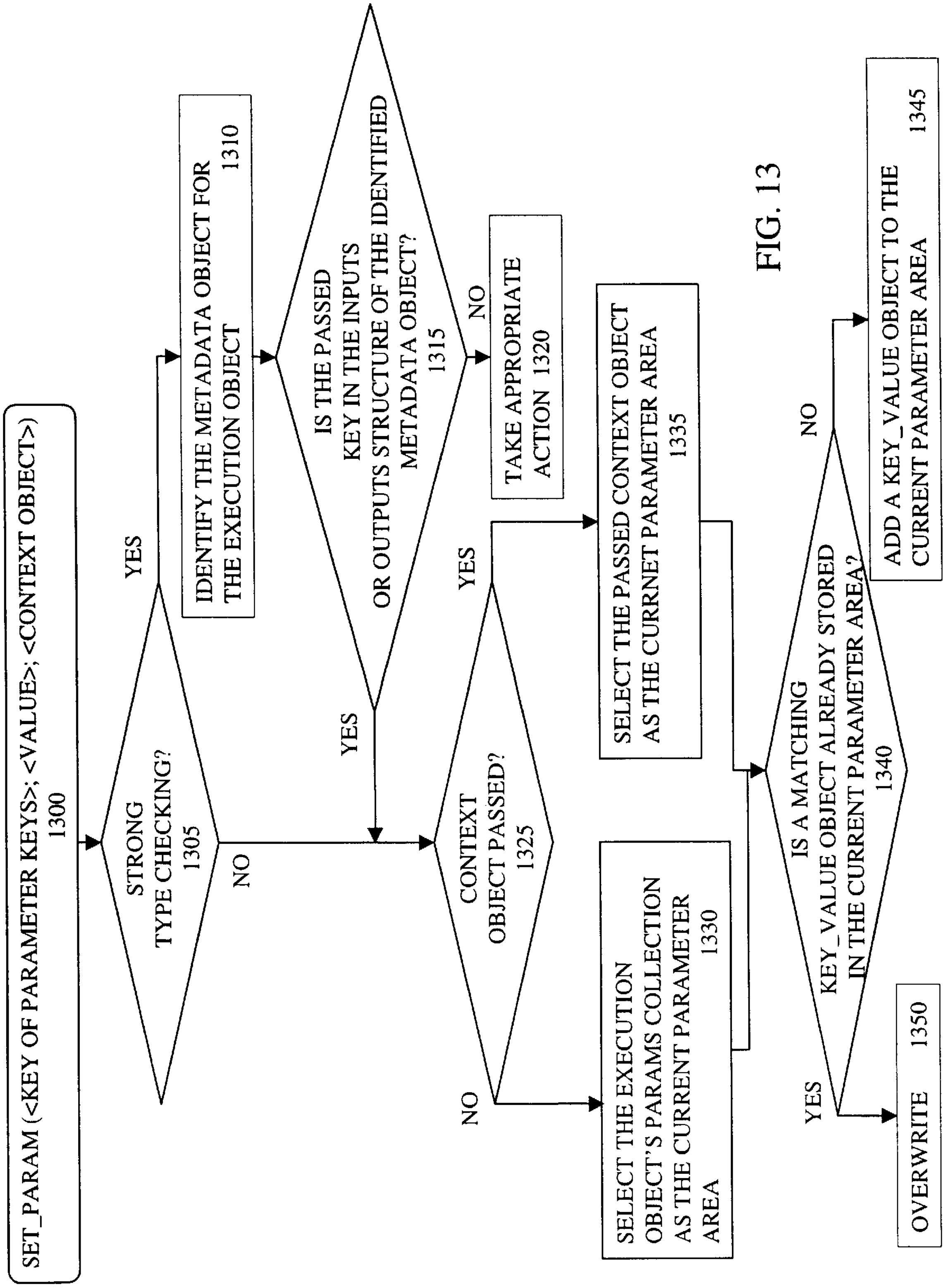
FIG. 13 is a flow diagram illustrating the operation of the SET_PARAM method of an execution object according to one embodiment of the invention.

FIG. 13 is a flow diagram illustrating the operation of the SET_PARAM method of an execution object according to one embodiment of the invention. The SET_PARAM method receives as input parameters: 1) the unique key for the parameter kind to be set; 2) the value to store for that parameter; 3) and optionally a context object (see block 1300). From block 1300 control passes to block 1305.

In block 1305, it is determined if strong type checking is enabled. If strong type checking is enabled, control passes to block 1310. Otherwise, control passes to block 1325. While one embodiment described in which strong type checking can be enabled, alternative embodiments do not support the enabling/disabling of strong type checking or do not support strong type checking at all.

In block 1310, the underlying METADATA object for the EXECUTION object is determined. To provide an example, the objects shown in FIG. 10 will be used. Particularly, assume the SET_PARAM method of the EXECUTION object 1015 is being applied. Using the METADATA_OBJECT_PTR structure of the EXECUTION object 1015, the METADATA object 1010 is identified. From block 1310, control passes to block 1315.

As shown in block 1315, it is determined if the passed key is stored in the INPUTS or OUTPUTS structure of the identified METADATA object. To continue the above example, assume that: 1) "EMPLOYEE_NAME" is the passed key; and 2) "John Smith" is the passed value. With reference to FIG. 10, in block 1315 it would be determined if the passed key ("EMPLOYEE_NAME") is stored in either the INPUTS or OUTPUTS structures of the METADATA object 1010. If so, control passes to block 1325. Otherwise, control passes to block 1320. While one embodiment is described in which both the INPUTS and OUTPUTS structures are searched, alternative embodiments search only one (e.g., the INPUTS structure).

In block 1320, the appropriate action is taken and the flow diagram ends. Of course, any number of different actions could be taken in block 1320, including the setting of a flag to indicate an error and the passing of control on to block 1325.

In block 1325, it is determined if a context object was passed to the SET_PARAM method. If so, control passes to block 1335 where the passed context object is selected as the current parameter area. Otherwise, control passes to block 1330 where the EXECUTION object's PARAMS collection is selected as the current parameter area. In the example of FIG. 10, block 1330 would result in the selection of the PARAMS structure of the EXECUTION object 1015. Control passes from both of blocks 1330 and 1335 to block 1340.

In block 1340, it is determined if a matching key value object is already stored in the current parameter area. In other words, it is determined if there is a KEY_VALUE object in the current parameter area which has stored in it's KEY_STORAGE structure the passed key. If so, control passes to block 1350 where the VALUE_STORAGE structure of the identified KEY_VALUE object is overwritten with the passed value (in this example, overridden with "John Smith"). Otherwise, control passes to block 1345 where a KEY_VALUE object is added to the current parameter area. The added KEY_VALUE object has stored in it's KEY_STORAGE and VALUE_STORAGE structures the passed key and value, respectively. In this manner, the values to be used as the input parameters to the underlying function can be set.

GET_PARAM Method

Figure 14:
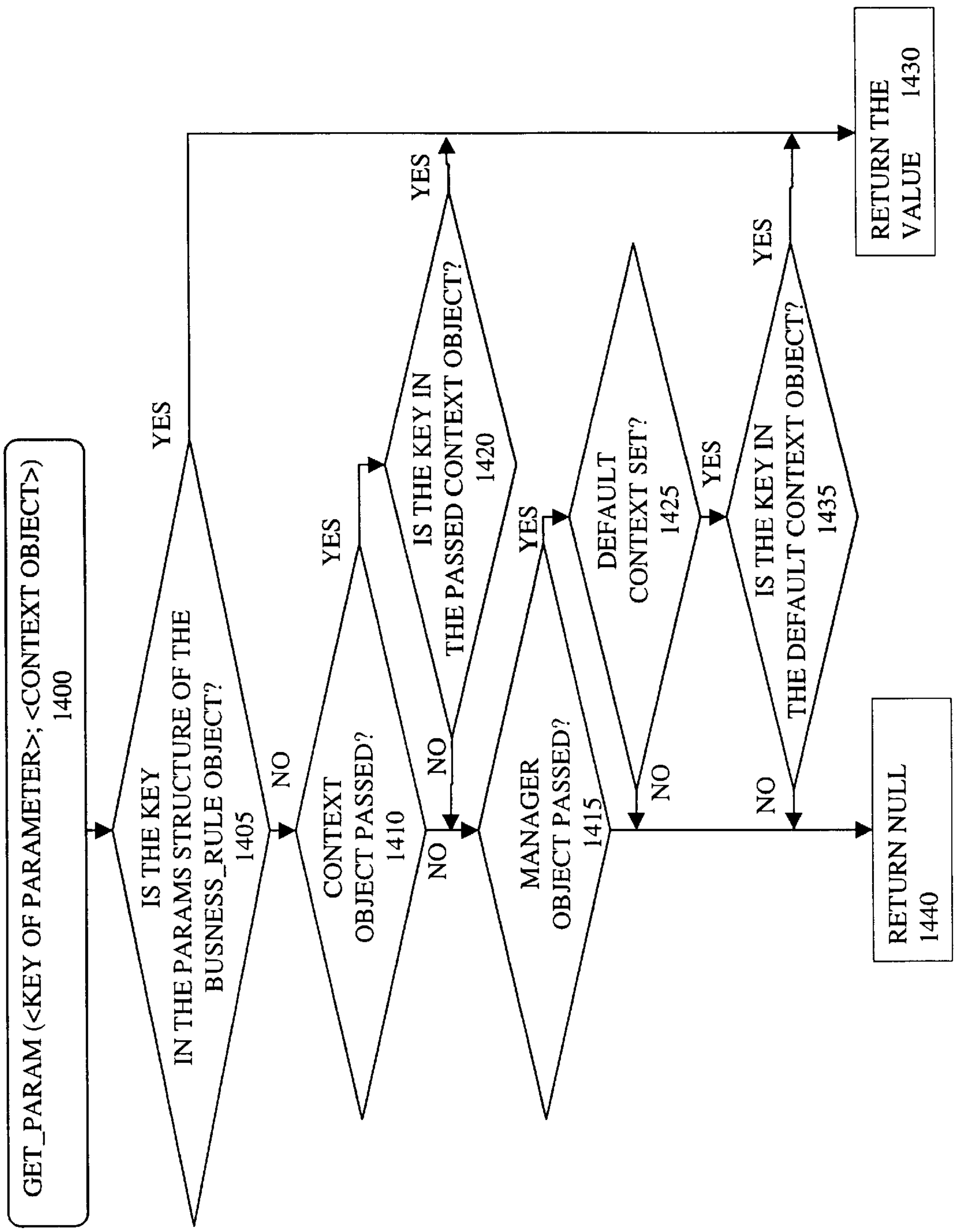
FIG. 14 is a flow diagram illustrating the operation of the GET_PARAM method according to one embodiment of the invention.

FIG. 14 is a flow diagram illustrating the operation of the GET_PARAM method according to one embodiment of the invention. The GET_PARAM method receives as input parameters: 1 the unique key of the parameter kind for which a value is desired; and 2) optionally a context object (see block 1400). From block 1400, control passes to 1405.

In block 1405, it is determined if the current key is in the PARAMS structure of the EXECUTION object. If so, control passes to block 1430 where the corresponding value is returned. Otherwise, control passes to block 1410. To perform block 1405, the KEY_VALUE objects in the PARAMS structure are searched to see if they contain in their KEY_STORAGE structure the passed key. If so, in block 1430 the value contained in the VALUE_STORAGE structure of the located KEY_VALUE object is returned. To provide an example, assume the key "EMPLOYEE_NAME" from FIG. 10 is passed. In this case, "John Smith" from the KEY_VALUE object 1020 would be returned.

In block 1410, it is determined if a context object was passed. If a context object was passed, control passes to block 1420. Otherwise, control passes to block 1415.

In block 1420 it is determined if the passed key is stored in the passed context object. If so, control passes to block 1430 where the associated value is returned. Otherwise, control passes to block 1415. To perform block 1420, the KEY_VALUE objects associated with the passed context object are searched to see if they contain in their KEY_STORAGE structure the passed key. If so, in block 1430 the value contained in the VALUE_STORAGE structure of the located KEY_VALUE object is returned. To provide an example, assume the key "EMPLOYEE_NAME" and the context object 1205 of FIG. 12 is passed. In this case, "John Smith" from the KEY_VALUE object 1220 would be returned.

As shown in block 1415, it is determined if a MANAGER object was passed. If a MANAGER object was passed, control passes to block 1425. Otherwise, control passes to block 1440 where NULL is returned.

In block 1425, it is determined if the MANAGER_PTR structure of the EXECUTION object is set. If so, control passes to block 1435. Otherwise, control passes to block 1440. Particularly, a given EXECUTION object may or may not be associated with a MANAGER object. If a given EXECUTION object is associated with a MANAGER object, the MANAGER_PTR structure of that EXECUTION object will store a pointer to that MANAGER object. Otherwise, the MANAGER_PTR structure of that EXECUTION object will store null.

In block 1425, it is determined if the default context structure of the identified MANAGER object is set. If so, control passes to block 1435. Otherwise, control passes to block 1440. To provide an example, the objects illustrated in FIG. 12 will be used. In FIG. 12, the MANAGER_PTR structure of the EXECUTION object 1215 contains a pointer to the MANAGER object 1240. In addition, the DEFAULT_CONTEXT structure of the manager object 1240 can store a pointer to one of the context objects in the context collection.

In block 1435, it is determined if the passed key is stored in the default context object. If so, control again passes to block 1430 where the value from the default context is returned. Otherwise, control passes to block 1440. Block 1435 is performed in a similar manner to block 1420.

In block 1440, null is returned to indicate that a value for the passed key is not currently associated with the EXECUTION object or the passed context object.

In summary, the PARAMS structure has priority over a passed context object, and a passed context object has priority over the default context (if any). As such, the default context can be used to store global/shared parameter values, whereas the passed context objects can be used to store specific parameter values. Furthermore, it is understood that in one embodiment the steps of FIG. 14 are performed individually for each key. As a result, the values for different keys can be acquired from different contexts (PARAMS, a passed context, the default context).

By way of example, assume that there are a number of contexts to be processed. Particularly, assume certain processing must be done for each of employees Jack and Jane. While certain information will be specific to Jack and Jane (e.g., name), assume that certain information is shared by Jack and Jane (e.g., they both work for department K). In the described embodiment, the global values (e.g., department K) can be stored in the default context of a manager object, while the inquiry specific values (e.g., information specific to Jack and Jane) can be stored in separate "inquiry specific" context objects (e.g., in the context collection structure of the manager object. As described later herein, applying the EXECUTE method for a given inquiry, the manager object and the appropriate inquiry specific context object can be passed as input parameters to the EXECUTE method. Assuming the execution object's PARAMS structure is empty, the global values and inquiry specific values can be acquired as described above. In this manner, the default context provides a global context feature, while the other contexts in the context collection structure provide specific context capabilities.

While one embodiment of the invention is described with reference to a particular priority structure, alternative embodiments of the invention can have a different priority scheme. Furthermore, while one embodiment allows for the selection from multiple contexts, alternative embodiments can provide more or less contexts to select from. For example, one embodiment of the invention provides for only the PARAMS structure. Furthermore, embodiments of the invention can implement the context objects to be hierarchical using well known techniques. In other words, a context object can have a parent context object. In this case, if a key is not found in a given context object, the system would recursively work its way up the hierarchy looking for the key.

In addition, while one embodiment is described in which the passed key is used to search through the various contexts provided (e.g., the PARAMS structure, the context objects), alternative embodiments of the invention also search keys for derivatives of the parameter kind class of the passed key when no match is found for the passed key. For example, with reference to FIG. 2A, assume that the passed key is the NAME key for NAME class 220. In one embodiment, assuming not match if found in the process, the searching described above with reference to FIG. 14 would be performed for each of the provided contexts. As a result of finding not match, a derivative of the parameter kind class NAME would be selected and the search would again be performed. Thus, the BEST_NAME key from FIG. 2A could be selected and the contexts would be searched. Assuming that multiple matches are found in a context, a technique is used to select one (e.g., the first one found is chosen).

While one embodiment is described in which each of the contexts is searched before moving on to derivatives, alternative embodiments also search for derivative before moving on to the next context. For example, the PARAMS structure would be searched for the passed key, as well as derivatives parameter kind classes thereof, before moving on to a passed context object and/or default context.

In order to locate derivatives of a parameter kind class, the CLASS-PARENT_LABEL method and object tracking structure(s) can be used. Particularly, the CLASS-PARENT_LABEL method from the passed key is applied to identify the class label. This class label is then applied to the class hierarchy structure of the exemplary object tracking structure to identify the class labels for the derivative classes. Using the derivative class label(s), the keys/class names for the derivative parameter kind classes can be determined from the class object placed in the instances tracking structure during class initialization. As previously described, alternative embodiments of the invention can use other mechanisms for tracking objects in the integration layer. Of course, embodiments of the invention which use different mechanisms for tracking objects in the integration layer would use their mechanism(s) accordingly to identify derivative parameter kind classes.

NEW_BUSINESS Rule Method

Figure 15:
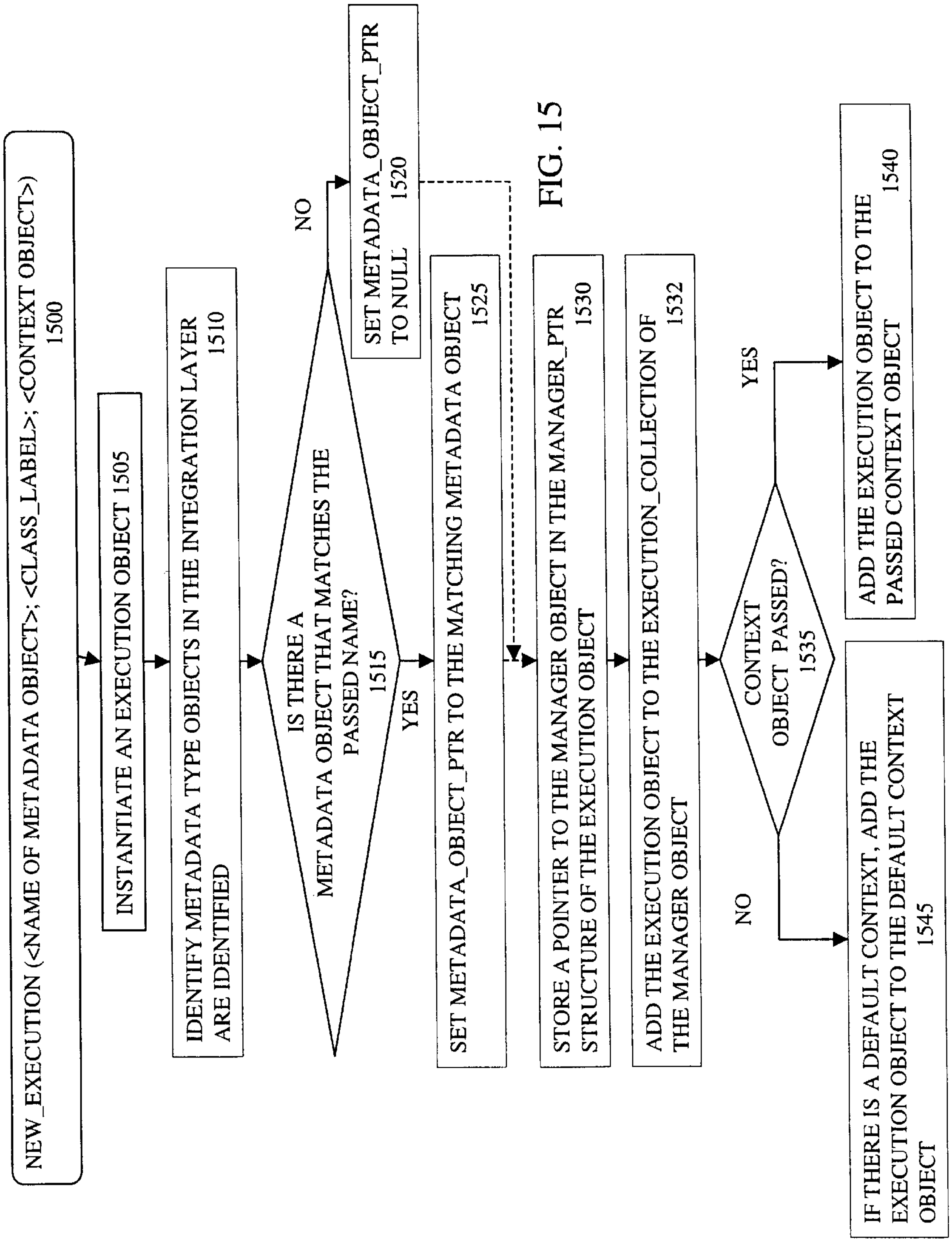
FIG. 15 is a flow diagram illustrating the operation of the NEW_EXECUTION method according to one embodiment of the invention.

FIG. 15 is a flow diagram illustrating the operation of the NEW_EXECUTION method according to one embodiment of the invention. As previously described, the operation of the NEW_EXECUTION method causes the creation of an execution object. The NEW_EXECUTION method receives as input parameters: 1) the name assigned a METADATA object; 2) optionally a value identifying one or more CLASS_LABELs according to the CLASS-PARENT_LABEL method; and 3) optionally a context object (see block 1500). Control passes from block 1500 to block 1505.

FIG. 15 actually illustrates two separate flows. In particular, one embodiment of the invention provides a NEW_EXECUTION routine outside of a manger object and a NEW_EXECUTION method inside a MANAGER object. As such, FIG. 15 contains dashed lines between blocks 1520/1525 and block 1530. The NEW_EXECUTION routine that resides outside a manager object ends at block 1520 or block 1525. In contrast, the NEW_EXECUTION method within a manager object continues on to perform blocks 1530 through 1545.

In block 1505, an execution object is instantiated and control passes to block 1510. In block 1510, metadata type objects in the integration layer are identified and control passes to block 1515. Block 1510 can be performed using a variety of different methods. For example, instances of the METADATA class (and derivatives thereof) can be stored in index structures. In an alternative embodiment, the object tracking structures previously described with reference to FIGS. 6A–8 are used. In particular, the label associated with the METADATA class can be found in the class hierarchy illustrated in FIG. 7. From the class hierarchy, the labels assigned the derivatives of the METADATA class (if any) can be identified. The identified labels can then be used to access the instance tracking structure illustrated in FIG. 8 to identify instances of the METADATA class (and derivatives thereof). Furthermore, the optionally passed CLASS_LABEL can be used to store the class label of a particular class to be used. When a CLASS_LABEL is passed, only the class with that class label (and derivatives thereof) are located in the instances tracking structure of FIG. 8.

As shown in block 1515, it is determined if one of the METADATA objects identified in block 1510 matches the passed name. Block 1515 is performed by comparing the passed name to the value stored in the NAME structure of the METADATA type objects identified in block 1510. If a match is found, control passes to block 1525 where a pointer to the matching METADATA object is stored in the METADATA_OBJECT_PTR structure of the newly instantiated EXECUTION object (the EXECUTION object instantiated in block 1505). Otherwise, control passes to block 1520 where the METADATA_OBJECT_PTR of the newly instantiated EXECUTION object is set to null.

During operation of the NEW_EXECUTION method within a MANAGER object, control passes from both of blocks 1520 and 1525 to block 1530.

In block 1530, a pointer to the MANAGER object is stored in the MANAGER_PTR structure of the newly instantiated EXECUTION object. In this manner, the EXECUTION object is associated with the MANAGER object as illustrated in FIG. 1B. From block 1530, control passes to block 1532.

In block 1532, the newly instantiated EXECUTION object is added to the EXECUTION_COLLECTION of the MANAGER object. Control passes from block 1532 to block 1535.

In block 1535, it is determined if a context object was passed. If so, control passes to block 1540 where the newly instantiated EXECUTION object is added to the passed context object. Otherwise, control passes to block 1545 where the newly instantiated EXECUTION object is added to the default context object in the MANAGER object if one is identified by the DEFAULT_CONTEXT structure of that MANAGER object.

FIND_BY_NAME Method

Figure 16:
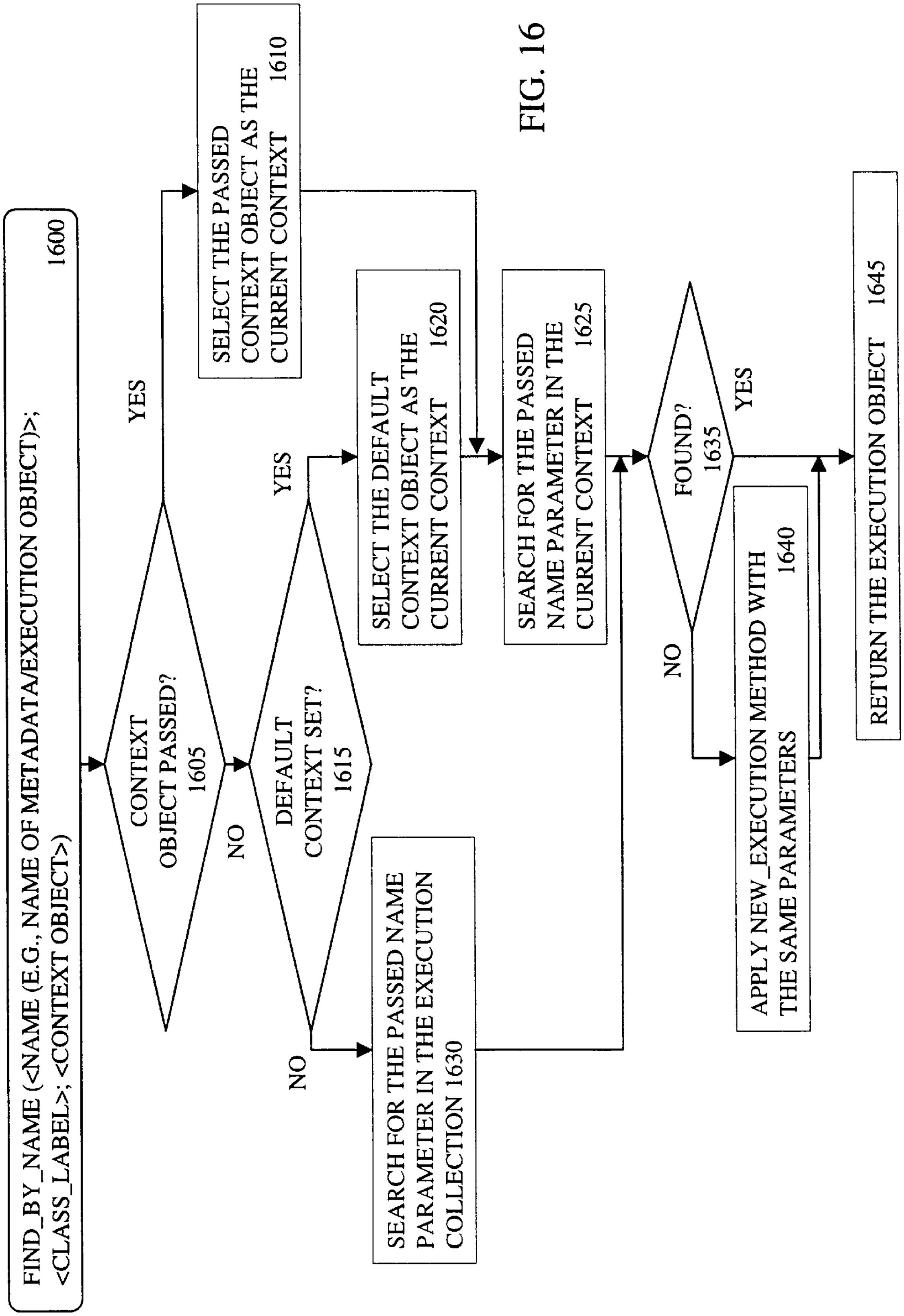
FIG. 16 is a flow diagram illustrating the operation of the FIND_BY_NAME method according to one embodiment of the invention.

FIG. 16 is a flow diagram illustrating the operation of the FIND_BY_NAME method according to one embodiment of the invention. The name assigned a METADATA object (and therefore assigned one or more execution objects) is passed as an input to the FIND_BY_NAME method. As previously described the FIND_BY_NAME method returns an execution object associated with the METADATA object having the passed name. In addition to the name, the FIND_BY_NAME method can have the following optional inputs: 1) a class label; and 2) a context object (see block 1600). Control passes from block 1600 to block 1605.

In block 1605 it is determined if a context object is passed. If so, control passes to block 1610. Otherwise, control passes to block 1615.

In block 1610, the passed context object is selected as the current context and control passes to block 1625.

In block 1615, it is determined if the DEFAULT_CONTEXT structure of the MANAGER object is set. If so, control passes to block 1620. Otherwise, control passes to block 1630.

In block 1620, the default context object is selected as the current context and control passes to block 1625.

In block 1625, the current context is searched for the passed name and control passes to block 1635. In other words, the system attempts to determine if an execution object matching the passed name is contained in the current context.

In block 1630, the EXECUTION_COLLECTION of the MANAGER object is searched for the passed name and control passes to block 1635.

If a matching execution object is found, control passes from block 1635 to block 1645 where that execution object is returned. Otherwise, control passes from block 1635 to block 1640.

In block 1640, the NEW_EXECUTION method of the MANAGER object is applied with the same parameters used in block 1600. As a result, a new execution object is instantiated. From block 1640 control again passes to block 1645.

FIND_BY_NEED Method

Figure 17:
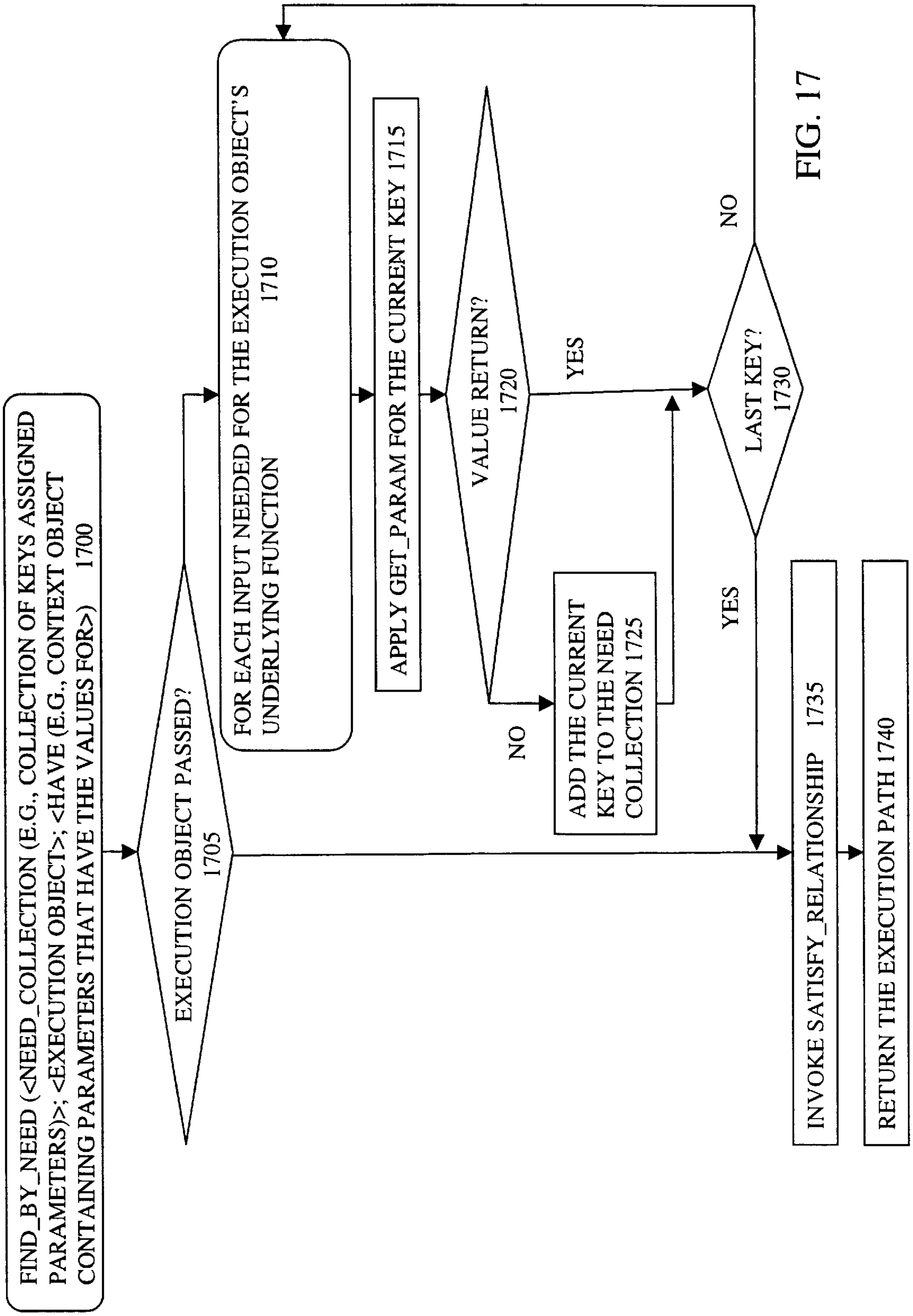
FIG. 17 is a flow diagram illustrating the operation of the FIND_BY_NEED method according to one embodiment of the invention.

FIG. 17 is a flow diagram illustrating the operation of the FIND_BY_NEED method according to one embodiment of the invention. As previously described, the FIND_BY_NEED method is part of the MANAGER class. One of the input parameters to the FIND_BY_NEED method is a NEED_COLLECTION structure. The keys assigned the parameter kinds for which values are desired are stored in a NEED_COLLECTION. Application of the FIND_BY_NEED method returns a set of EXECUTION objects that can be used to identify values for the needs. Particularly, the EXECUTION objects in the returned set of EXECUTION objects have underlying functions with output parameters matching the keys in the NEED_COLLECTION.

By way of example, the objects of FIG. 10 will be used. With reference to FIG. 10, assume that the NEED_COLLECTION contains the unique key "YEARLY_SALARY." As previously described, since the output parameter TEMP3 of the SALARY_FUNCTION 1000 has been assigned the unique key "YEARLY_SALARY," the unique key YEARLY_SALARY is stored in the OUTPUTS structure of the METADATA object 1010. As a result, application of the FIND_BY_NEED method would identify the underlying function for the METADATA object 1010 provides an output parameter matching the unique key contained in the NEED_COLLECTION, and therefore return an execution object associated with the METADATA object 1010.

The FIND_BY_NEED method additionally has the following optional inputs: 1) an execution object; and 2) a HAVE structure (e.g., a context object containing parameters for which there are currently values assigned). From block 1700 control passes to block 1705.

In block 1705, it is determined if an execution object is passed. If so, control passes to block 1710. Otherwise, control passes to block 1735.

With reference to block 1710, blocks 1710–1730 in FIG. 17 are performed for each input needed for the execution object's underlying function. By way of example, the objects of FIG. 10 will be used. Particularly, the EXECUTION object 1015 identifies the METADATA object 1010. The METADATA object 1010 is associated with the underlying SALARY_FUNCTION 1000. The SALARY_FUNCTION 1000 requires the input parameter kinds assigned the unique keys "EMPLOYEE_NAME" and "EMPLOYEE_NUMBER." As a result, the METADATA object 1010 has stored in it's INPUTS structure the keys "EMPLOYEE_NAME" and "EMPLOYEE_NUMBER." Thus, blocks 1710–1730 of FIG. 17 are performed for both the unique keys "EMPLOYEE_NAME" and "EMPLOYEE_NUMBER."

For certain functions, certain inputs will be required inputs, while other are optional inputs. In one embodiment of the invention, the input(s) "needed" for the execution object's underlying function are all inputs (regardless of whether they are optional). In such an embodiment, the key for every input to a function is stored in the INPUTS structure of the metadata object, and the inputs needed includes the parameter for each key in the INPUTS structure. In an alternative embodiment, the input(s) "needed" include those that are required, not those that are optional. In particular, in one such embodiment, data is stored as part of the INPUTS structure to indicate which (if any) of the parameters are optional. Parameters which are marked as optional are not considered "needed" as defined with reference to block 1705.

In block 1715, the GET_PARAM method is applied for the current key and control passes to block 1720. As previously described, the GET_PARAM method returns a value if the execution object has a value associated with the current key (or in certain embodiments, a value associated with a derivative parameter kind class if not match is found for the current key). Otherwise, the GET_PARAM method returns null.

In block 1720, it is determined if a value was returned. If so, control passes to block 1725. Otherwise, null was returned and control passes to block 1730.

In block 1725, the current key is added to the passed NEED collection and control passes to block 1730. In this manner, keys without associated values in the passed execution object are added to the NEED collection.

As shown in block 1730, it is determined if the last key has been processed. If not, control passes back to block 1710. Otherwise, control is passed to block 1735.

In block 1735, a SATISFY_RELATIONSHIP routine is invoked and control passes to block 1740. Invoking the SATISFY_RELATIONSHIP routine generates an execution path of EXECUTION objects.

There are a number of different ways to implement the SATISFY_RELATIONSHIP routine. For example, in one embodiment of the invention, the SATISFY_RELATIONSHIP routine is actually code contained in the FIND_BY_NEED method. In an alternative embodiment, the SATISFY_RELATIONSHIP routine has been removed from the FIND_BY_NEED method and placed in a separate location. For example, the concept of relationship objects later described herein can be used for this purpose. In one embodiment of the invention, a relationship object is formed for storing a method to implement the SATISFY_RELATIONSHIP routine. The operation of the SATISFY_RELATIONSHIP routine will be further described herein with reference to FIG. 18.

As shown in block 1740, an execution path is returned.

SATISFY_RELATIONSHIP Routine

Figure 18A:
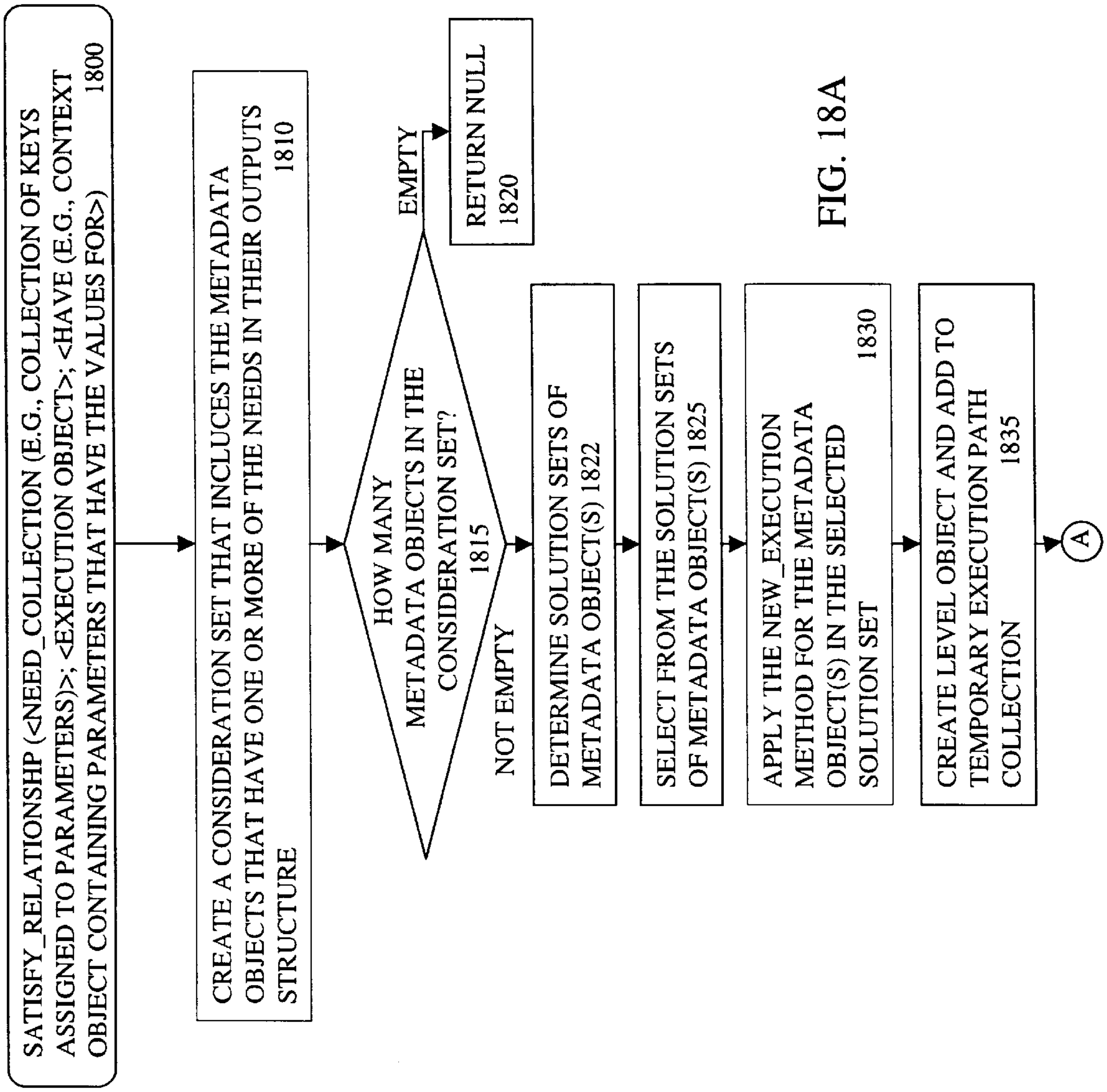
FIG. 18A is a part of a flow diagram illustrating the operation of the SATISFY_RELATIONSHIP routine according to one embodiment of the invention.
Figure 18B:
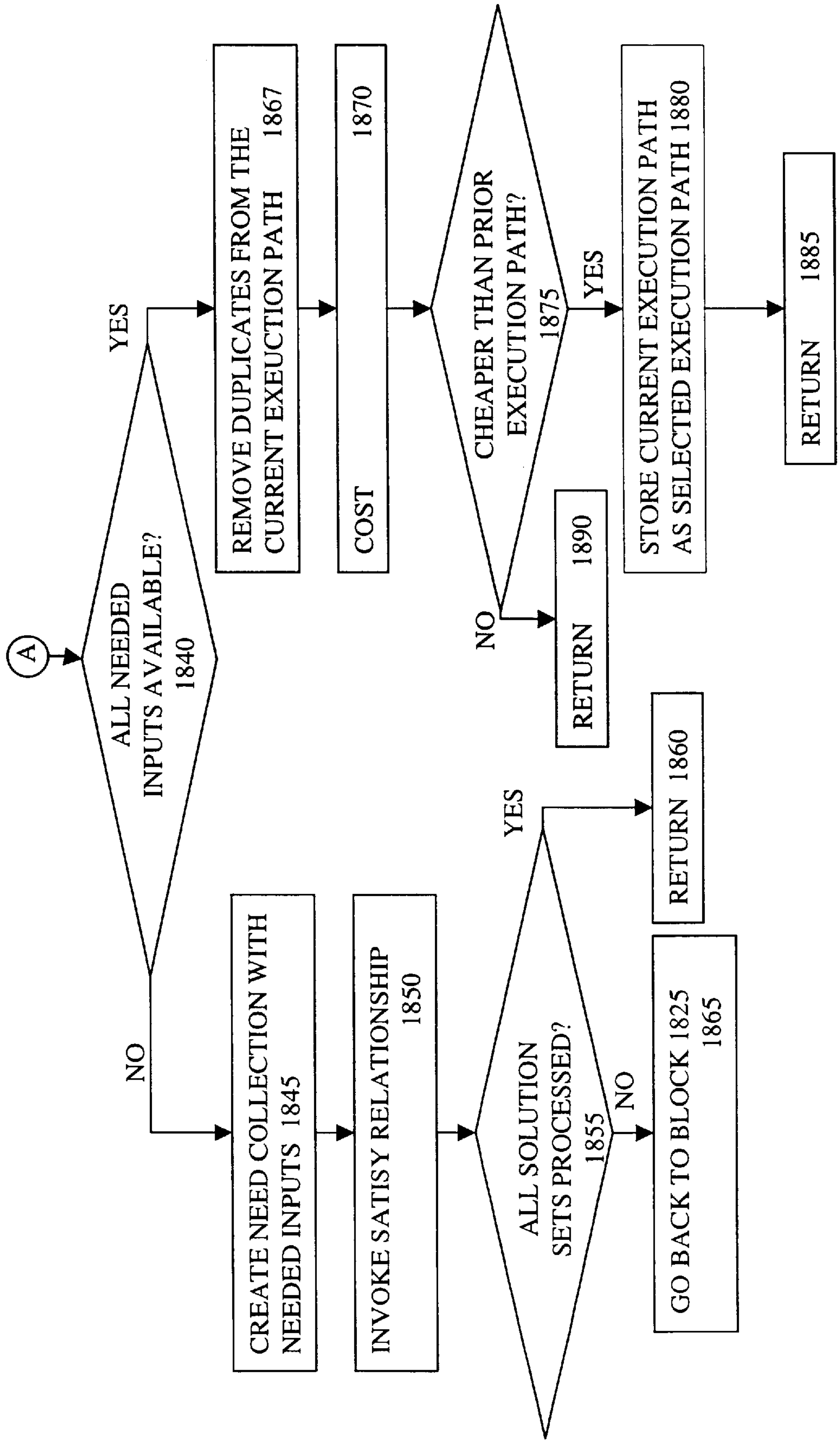
FIG. 18*b* is the remainder of a flow diagram illustrating the operation of the SATISFY_RELATIONSHIP routine according to one embodiment of the invention.

FIGS. 18A–B are a flow diagram illustrating the operation of the SATISFY_RELATIONSHIP routine according to one embodiment of the invention. The SATISFY_RELATIONSHIP routine attempts to return an execution path whose underlying functions will result in providing the output parameter kinds assigned the keys contained in the passed NEED_COLLECTION. The SATISFY_RELATIONSHIP routine is called with the same inputs as the FIND_BY_NEED method (see block 1800). From block 1800, control passes to block 1810.

In block 1810, a consideration set that includes the METADATA objects that have one or more of the needs in their OUTPUTS structure is created. By way of example, the objects of FIG. 10 will be used. Assume that the key "EMPLOYEE_NAME" is contained within the passed NEED_COLLECTION. Since the OUTPUTS structure of the METADATA object 1010 contains the "EMPLOYEE_NAME" key, the METADATA object 1010 would be added to the consideration set. In one embodiment, the previously described manners of identifying METADATA type objects (and derivatives thereof) are used (e.g., a CLASS_LABEL parameter could optionally be passed). From the identified metadata type objects, metadata type objects having one or more needs in their OUTPUTS structure are selected. From block 1810, control passes to block 1815.

In this manner, the exposed metadata in the METADATA objects (the unique keys contained in the outputs structure) are used to identify underlying functions in the integration layer that provide as output parameters those parameter keys identified in the NEED_COLLECTION. In other words, the exposed metadata in the METADATA objects allows for a search for the underlying functions whose output(s) will satisfy a particular need(s) of interest.

In block 1815, it is determined how many METADATA objects are in the consideration set. If the consideration set is empty, control passes to block 1820. However, if the consideration set is not empty, control passes block 1822.

In block 1820, there are no metadata objects with underlying functions that will provide the desired output parameter kind. As such, in block 1820 null is returned.

In block 1822, one or more solution sets of METADATA object(s) from the consideration set are determined and control passes to block 1825. In particular, the system determines from the consideration set one or more solution sets of metadata objects whose underlying functions will collectively provide values for the needs in the passed NEED_COLLECTION structure.

Many different techniques can be used for determining the solution sets. For example, in one embodiment block 1822 is performed by selecting the first metadata object(s) in the consideration set that satisfy the needs. In another alternative embodiment of the invention, block 1822 is performed by first extracting into a solution set the metadata objects from the consideration set that must be used. In particular, if only one of the METADATA object's underlying function provides one or more of the needs in the NEED_COLLECTION, then that metadata object must be used. Next, it is determined how many metadata objects are left in the consideration set. If no METADATA objects are left in the consideration set (all of the metadata object(s) in the consideration set must be used), then only one solution set exists and control passes to block 1830. However, if there are still multiple metadata objects in the consideration set (i.e., multiple ones of the underlying functions can be used to satisfy the same need identified in the NEED_COLLECTION), there are multiple execution paths (e.g., see FIG. 21) and multiple solution sets are possible (however, certain embodiments only determine one). Again, a number of different techniques can be used to form solution sets from the metadata objects left in the consideration set after necessary metadata objects are removed (note, each solution set will include the metadata objects that must be used). For example, the first metadata objects that satisfy the needs could be selected. As another example, all of the solution sets are determined (e.g., certain embodiments index all the output parameters, and use the indexes to determine the solution sets). As another example, a costing technique could be used.

In block 1825, one of the solution set(s) is selected and control passes to block 1830. Again, any number of techniques could be used to perform this selection. For example, in one embodiment block 1825 is performed by selecting the first solution set. In an another embodiment of the invention, the well known technique of costing is used to select from the solution sets. When using costing, the solution set whose metadata object(s)' underlying functions would cost the least to produce the needs identified by the NEED_COLLECTION is selected. The optional HAVE structure can be used during this costing process to determine which of the functions for the metadata objects in a solution set will be cheapest. Particularly, the HAVE structure identifies the values that are already established. As such, if two metadata objects will satisfy a need, but the first requires an input that is not in the HAVE structure and the second does not, then the second will likely cost less than the first.

As shown in block 1830, the NEW_EXECUTION method for the METADATA object(s) in the selected solution set is applied. For example, if the above consideration/solution set technique is used, the NEW_EXECUTION method is applied for each of the metadata object(s) in the solution set. As a result, block 1830 provides an execution object for each metadata object in the solution set. Control passes from block 1830 to block 1835. With reference to the example of FIG. 21, assume that function E was selected. As such, an execution object for the metadata object identifying the function E would be created.

In block 1835, a level object is created and added to the beginning position of ordered execution in a temporary execution path collection. In other words, by block 1835 the functions for one level of an execution path have been identified and execution objects have been formed for each function. These execution objects are then placed in a level object which is placed in the ordered collection of a temporary execution path. With reference to the above example where function E of FIG. 21 was selected, a level N object would be created for the execution object from block 1830.

As shown in block 1840, it is determined if all of the needed inputs to the functions represented by the level object of block 1835 are available (in the HAVE structure). If so, control passes to block 1867 because an end of an execution path has been reached. Otherwise, control passes to block 1845. With reference to the above example where function E of FIG. 21 was selected, control would pass to block 1845.

In an alternative embodiment, an optimization is made in which a block is performed between blocks 1835 and 1840. In particular, it is determined, for each execution object on the current level, whether all of the inputs for that execution object's underlying function are in the HAVE structure. In other words, it is determined whether an execution object's underlying function could have been executed on the early level. For each such execution object, the output(s) of that execution object are added to the HAVE structure.

In block 1845, a need collection is created for the needed inputs and control passes to block 1850. As shown in block 1850, the satisfy relationship routine is invoked and control passes to block 1855. As such, a reiterative process is begun to work up the execution path through the outputs of the function. With reference to the example of FIG. 21, the needs for E will identify the functions A, D and F.

As shown in block 1855, it is determined if all of the solution sets have all been processed. If not, control passes to block 1865 from which control is passed back to block 1825 for selection of another solution set. To continue the above example, assume that the consideration set A, D, and F is being processed. The consideration set A, D, and F results in two solution sets: (A, D) and (A, F). In addition, on the initial pass through block 1825, assume that the solution set (A, D) was selected. As a result, when block 1855 is reached, the solution set (A, F) will not yet have been processed and control will pass back to block 1825 where solution set (A, F) will be selected. Whereas, if it was determined that all the solution sets have been processed, control passes to block 1860 where a return is performed. It should be noted that one embodiment only completes one solution set, and therefore does not perform blocks 1855 and 1865 when an execution path has been established (e.g., control passes from block 1850 to block 1860).

As shown in block 1867, the end of an execution path has been reached and duplicate execution objects are removed. From block 1867, control passes to block 1870. This concept is further described later herein. While one embodiment is described in which duplicates are removed, alternative embodiments need not remove duplicates.

Figure 21:
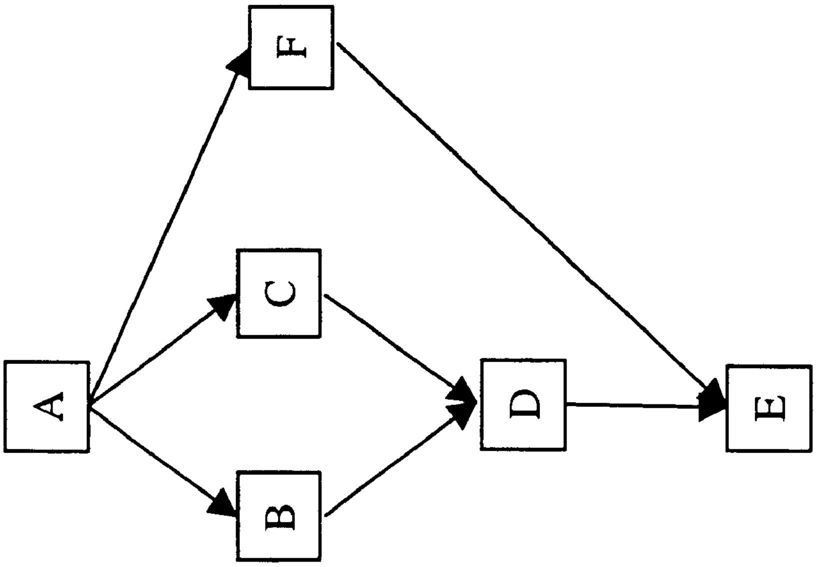
FIG. 21 is a conceptual diagram illustrating exemplary execution paths according to one embodiment of the invention.

In block 1870, the path is costed and control passes to block 1875. For example, when function A of FIG. 21 is reached. Any number of different costing mechanisms could be used. In one embodiment of the invention, each metadata object has stored therein a value indicating the cost of the metadata object. The values from each of the metadata objects in the execution path are summed to determine the cost of the execution path. In alternative embodiments of the invention, other costing mechanisms can be used (e.g., a method could be used to determine cost).

As shown in block 1875, it is determined if the current execution path is cheaper than a previously selected execution path (if any). If the current execution path is cheaper, control passes to block 1880. Otherwise, control passes to block 1890.

In block 1880, the current execution path is stored as the selected execution path and control passes to block 1885 where a return is performed. In this manner, the cheapest of the execution paths is selected.

As shown in block 1890, a previously selected execution path is cheaper and the current temporary execution path is discarded as a return is performed.

With reference to FIG. 21, the flow of FIG. 18 will now be described. Assume that the initial consideration set includes function E, and that E is selected in block 1825. Processing for E will reach block 1850 where a recursive call is made based on the input needs of function E (Best Name and Spouse's Name). On this first recursive call, the consideration set will include A, D, and F; and the solution sets will be (A, D) and (A, F). Assume that solution set (A, D) is selected (in block 1825). Processing for (A, D) will reach block 1850 where a recursive call is made based on the input needs of function D (the input of function A is available in the HAVE structure). On this second recursive call, the consideration set will include B and C; and the solution sets will be (B) and (C). Assume that function B is selected. Processing for B will reach block 1850 where a recursive call is made based on the input needs of function B (Id). On this third recursive call, the consideration set will include function A, and thus there is one solution set. Since the inputs from the solution set of A are available in the HAVE structure, processing for A will reach block 1870 where duplicates are removed. Particularly, the execution path is now A to B, B to D, and both A and D to E. Since function A is duplicated, one is removed to create the execution path A to B, B to D, and D to E. This execution path is then costed. In addition, since this is the first execution path, this path will be stored as the selected execution path and block 1885 will be reached.

As a result of the return in block 1885, processing will return to block 1855 of the second recursive call. On this call, control will pass through block 1865 to block 1825 because the solution set (C) remains (the path from D to A through C remains). This return to block 1825 will result in the solution set (C) being selected (instead of the already processed solution set that contained B). Processing for the solution set (C) will reach block 1850 where a fourth recursive call is made based on the input needs of function C. On this fourth recursive call, the solution set containing A will again be determined and selected. Processing for A will again reach block 1870 where this second execution path is costed. Assuming this second execution path is not cheaper than the first, block 1885 is reached and processing returns to block 1855 of the second recursive call. This time, all solution sets have been processed (both B and C of the left side tree) for the second recursive call and processing returns to block 1855 of the first recursive call. Processing continues as such.

While one embodiment is described in which each execution path is processed to completion, alternative embodiments of the invention attempt to improve performance by restricting execution path processing. For example, one such alternative embodiment calculates costing on the fly and terminates processing of an execution path that exceeds a previous best execution path. As another example, alternative embodiments can restrict the number of recursive levels processed (e.g., execution paths over a certain number of levels are aborted).

In addition, while one embodiment is described in which costing is used, alternative embodiments do not use costing. For example, one such alternative embodiment just picks the first metadata objects in block 1825 to create a first execution path, and never determines other execution paths (e.g., does not perform blocks 1855, 1865, 1875, 1890).

The FIND_BY_NEED_AND_EXECUTE method is the same as the FIND_BY_NEED method, with the exception that the FIND_BY_NEED_AND_EXECUTE causes the EXECUTE methods on the execution path to be applied. Application of the EXECUTE methods on the execution path results in values being provided for the keys contained in the NEED_COLLECTION.

EXECUTE Method

Figure 19:
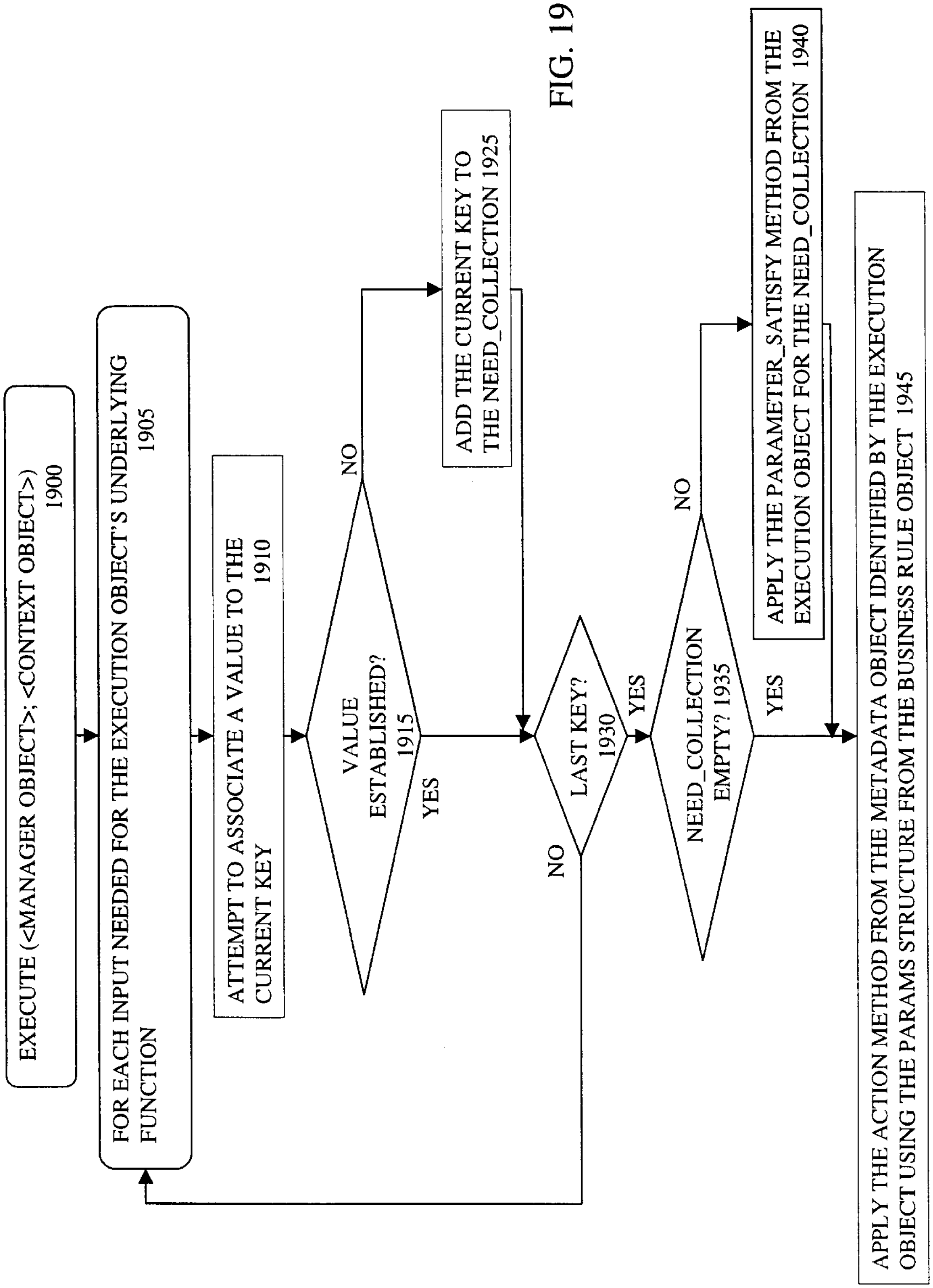
FIG. 19 is a flow diagram illustrating the operation of the EXECUTE method according to one embodiment of the invention.

FIG. 19 is a flow diagram illustrating the operation of the EXECUTE method according to one embodiment of the invention. As previously described, a given EXECUTION is associated with a METADATA object, which in turn is associated with an action unit, which in turn is associated with a function being tracked by the integration layer. Application of the EXECUTE method from an execution object causes the execution of the underlying function using the values associated with that EXECUTION object, as well as causes the associating of the outputs from the underlying function with that EXECUTION object. It is worthwhile to point out that the phrase "the values associated with an execution object" can refer to either the KEY_VALUE objects stored in the PARAMS structure of that EXECUTION object or a context object in a MANAGER object. In addition, certain embodiments of the invention optionally allow a context object be passed as an input parameter to the EXECUTE method. In this situation, one or more of the KEY_VALUE objects in the passed context object may be used.

As described later herein, there are times when values for the required inputs to the underlying functions are not yet associated with the EXECUTION object (or contained in the passed context object, if present). In this situation, the previously described satisfy-relationship routine can be used in a recursive fashion to generate EXECUTION objects whose underlying functions are applied to provide the missing values.

The inputs to the EXECUTE method are optionally: 1) a MANAGER object; and 2) a context object (see block 1900). Control passes from block 1900 to block 1905.

With reference to block 1905, blocks 1910–1930 in FIG. 19 are performed for each input needed for the execution object's underlying function. Block 1905 can be performed in a similar manner to block 1710. Control passes from block 1910 to block 1915.

As shown in block 1910, an attempt is made to associate a value with the key currently being processed. From block 1910, control passes to block 1915.

In one embodiment, block 1910 is performed by applying the GET_PARAM method for the current key and then applying the SET_PARAM method for the current key with the value from the GET_PARAM method. In an alternative embodiment, block 1910 is performed with a modified version of the flow shown in FIG. 14. Particularly, the SET_PARAM method need not be applied after the GET_PARAM if the value is already stored in the PARAMS structure. As such, this modified version of the flow in FIG. 14 does not apply the SET_PARAM method if the matching KEY_VALUE object is found in the PARAMS structure. In addition, as similarly described with reference to the GET_PARAM method, certain embodiments of the invention may allow the searching for matches to be performed using derivatives of the parameter kind class assigned the passed key. Furthermore, certain embodiments of the invention may provide searching for matches using derivatives of the parameter kind class for only one of the GET_PARAM method and the technique used for block 1910.

In the embodiment previously described, the PARAMS structure has priority over a passed context object, and a passed context object has priority over the default context (if any). As such, the default context can be used to store global/shared parameter values, whereas the passed context objects can be used to store specific parameter values. Furthermore, it is understood that in one embodiment that blocks 1910–1930 are performed individually for each key. As a result, the values for different keys can be acquired from different contexts (PARAMS, a passed context, the default context).

By way of example, assume that there are a number of contexts to be processed. Particularly, assume certain processing must be done for each of employees Jack and Jane. While certain information will be specific to Jack and Jane (e.g., name), assume that certain information is shared by Jack and Jane (e.g., they both work for department K). In the described embodiment, the global values (e.g., department K) can be stored in the default context of a manager object, while the inquiry specific values (e.g., information specific to Jack and Jane) can be stored in separate "inquiry specific" context objects (e.g., in the context collection structure of the manager object. When applying the EXECUTE method for a given inquiry, the manager object and the appropriate inquiry specific context object can be passed as input parameters to the EXECUTE method. Assuming the execution object's PARAMS structure is empty, the global values and inquiry specific values will be associated with the execution object as described above. In this manner, the default context provides a global context feature, while the other contexts in the context collection structure provide specific context capabilities.

While one embodiment of the invention is described with reference to a particular priority structure, alternative embodiments of the invention can have a different priority scheme. Furthermore, while one embodiment allows for the selection from multiple contexts, alternative embodiments can provide more or less contexts to select from. For example, one embodiment of the invention provides for only the PARAMS structure. In addition, while certain embodiments allow values for different keys to be provided from different contexts, alternative embodiments select one context from which all values must come. Furthermore, embodiments of the invention can implement the context objects to be hierarchical using well known techniques. In other words, a context object can have a parent context object. In this case, if a key is not found in a given context object, the system would recursively work its way up the hierarchy looking for the key.

As shown in block 1915, it is determined if a value was associated with the current key. If so, control passes to block 1930. Otherwise, control passes to block 1925.

In block 1925, since there is no value associated with the key, a need has been identified (i.e., one of the required input parameters for the underlying function has no value). As such, in block 1925, the current key is stored in a NEED_COLLECTION. As previously described, the NEED_COLLECTION is used by the SATISFY_RELATIONSHIP routine to locate other execution objects with underlying functions that can provide values for missing input parameters. The manner in which this is performed during the EXECUTE method is further described later herein. Control passes from block 1925 to block 1930.

In block 1930, it is determined if all of the keys from the INPUTS structure of the metadata object have been processed. If not, control passes back to block 1905. Otherwise, control passes to block 1935.

In block 1935, it is determined if the NEED_COLLECTION is empty. If the NEED_COLLECTION is empty, then there are values established for each of the required input parameters to the underlying function and control passes to block 1945. However, if there are keys in the NEED_COLLECTION, control passes to block 1940.

In block 1940, the PARAMETER_SATISFY method from the EXECUTION object is applied for the NEED_COLLECTION. The PARAMETER_SATISFY method will be described later herein with reference to FIG. 20. However, it is worthwhile to note that the PARAMETER_SATISFY method is designed to use the basic techniques of the SATISFY_RELATIONSHIP routine to locate and execute other functions (via EXECUTION objects and METADATA objects) that will provide the missing input parameter values. From block 1940, control passes to block 1945.

As shown in block 1945, the action method from the metadata object identified by the execution object is caused to be executed using the established parameter values.

Thus, the invention provides for an execution framework for functions that allows execution plans to be determined and performed.

PARAMETER_SATISFY Method

Figure 20:
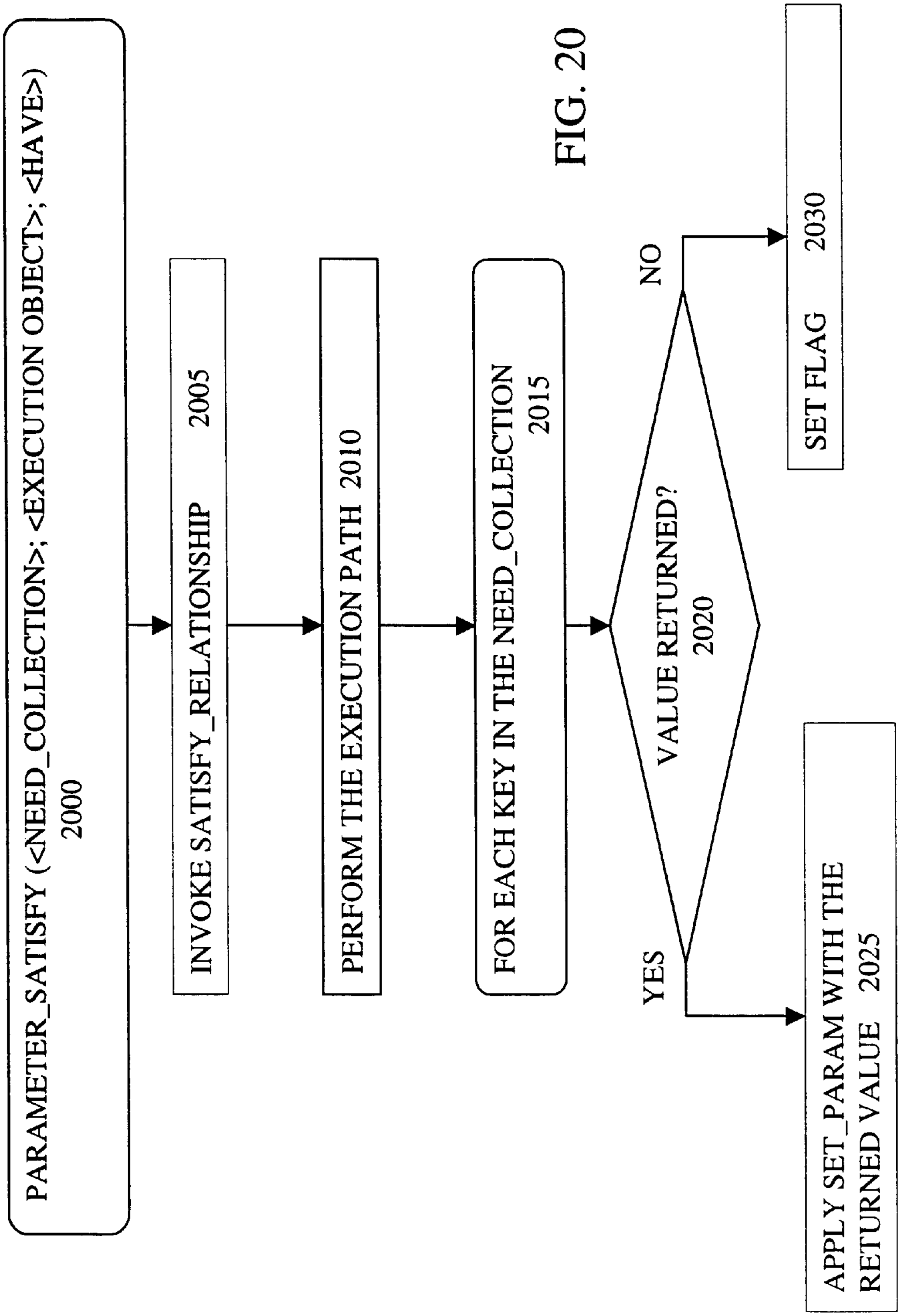
FIG. 20 is a block diagram illustrating the PARAMETER_SATISFY method according to one embodiment of the invention.

FIG. 20 is a block diagram illustrating the PARAMETER_SATISFY method according to one embodiment of the invention. The PARAMETER_SATISFY method receives the same inputs as the FIND_BY_NEED method previously described (see block 1700). From block 2000, control passes to block 2005.

In block 2005, the SATISFY_RELATIONSHIP routine is invoked and control passes to block 2010. As previously described, invoking the SATISFY_RELATIONSHIP routine will attempt to return an execution path for the NEED COLLECTION parameter.

In block 2010, the execution path is performed and control passes to block 2015. In one embodiment, the execute methods of the execution objects in the level objects of the EXECUTION_PATH_COLLECTION structure are applied in level order.

It should be noted that application of each EXECUTE method requires the operations illustrated in FIG. 19 to be performed. It should be understood that application of one or more of these EXECUTE methods could also result in a determination that the values for one or more required inputs of an underlying function is missing. In other words, this operation can be recursive in nature.

According to the embodiment shown in FIG. 20, for each key in the NEED_COLLECTION (see block 2015) it is verified that a value was acquired. In particular, block 2020 determines if a value was returned. If a value was not returned, control passes to block 2030 in which a flag is set for debugging purposes. However, if a value was returned, then the SET_PARAM method is applied with the returned value to associate the value with the EXECUTION object. While one embodiment is described in which verification that a value was returned for each key in the need collection is performed, alternative embodiments can avoid this verification and/or provide for this verification in other areas.

In this manner, values for any of the missing input parameters to the underlying function are located as part of applying the EXECUTE method from the EXECUTION object.

Relationship Objects

In one embodiment, the integration layer also includes two types of objects, base objects and relationship objects. The base objects describe the disparate integration sources A-i. The relationship objects describe relationships between the base objects, as well as relationships between the relationship objects themselves.

Specifically, the common concept of encapsulation in object technology is to place data with its' associated methods together in a single object. In contrast, the integration layer is developed such that those methods that express a relationship (referred to herein as "relationship methods") are placed in separate objects—the relationship objects. In this manner, a higher degree of encapsulation is provided. While relationship methods within relationship objects are similar to methods commonly found in object technology in that they can be applied to the objects that contain them, relationship methods within relationship objects are different in that they often are applied to other objects, including base objects and other relationship objects. For a further description of relationship objects, see "A Method and Apparatus for Providing Relationship Objects and Various Features to Relationship and Other Objects," filed Sep. 30, 1998, by Bhalchandra Ghatate, which is herein incorporated by reference.

As previously indicated, in one embodiment of the invention, relationship object(s) are used to provide for one or more SATISFY_RELATIONSHIP routines. In this manner, different types of satisfy relationship routines can be provided and selected from using the relationship object techniques.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A machine readable medium having stored thereon:

a function requiring a set of one or more input parameters;

a first object including, a first structure storing a key for each of said set of input parameters, and an action method, which when applied by a processor, causes that processor to invoke an action unit; and a second object including, a first structure to store data for identifying, for each of said set of input parameters, the corresponding key and a value for that input parameter, a second structure identifying said first object, and an execute method, which when applied by a processor, causes that processor to apply said action method;

said action unit including instructions, which when executed by a processor, cause that processor to, access said values, and invoke said function using said values as input parameters.

2. The machine readable medium of claim 1, wherein said function is contained within said action unit.

3. The machine readable medium of claim 1, wherein said first structure in said second object has stored therein, for at least one of said set of input parameters, the corresponding key and a value for that input parameter.

4. The machine readable medium of claim 1, wherein:

the data in said first structure of said second object identifies a third object; and said third object includes a structure to store, for one or more of said set of input parameters, the corresponding key and value for that input parameter.

5. The machine readable medium of claim 1, wherein:

the data in said first structure of said second object identifies a third object; and said third object includes, a first structure to store a plurality of context objects, each of said plurality of context objects to store, for one or more of said set of input parameters, the corresponding key and a value for that input parameter, and a second structure to store data identifying one of said plurality of context objects as a default context object.

6. The machine readable medium of claim 1, wherein:

said function provides a set of one or more output parameters;

said first structure in said first object also storing a key for each of said set of output parameters.

7. A machine readable medium having stored thereon:

a function requiring a set of one or more input parameters;

a first object including, a first structure storing a key for each of said set of input parameters, and an action method, which when applied by a processor, causes that processor to invoke said function; and a second object including, a first structure identifying a third object, a second structure identifying said first object, and an execute method, which when applied by a processor, causes that processor to apply said action method; and said third object including, a first structure to store a plurality of context objects, each of said plurality of context objects to store, for one or more of said set of input parameters, the corresponding key and a value for that input parameter, and a second structure to store data identifying one of said plurality of context objects as a default context object.

8. The machine readable medium of claim 7 further having stored thereon:

an action unit including said function as a method.

9. The machine readable medium of claim 7 further having stored thereon:

an action unit including instructions, which when executed by a processor, cause that processor to invoke said function; and wherein said action method, when applied, causes the execution of the instructions in said action unit.

10. The machine readable medium of claim 7 further having stored thereon:

an action unit including instructions, which when executed by a processor, cause that processor to, access values for one or more of said set of input parameters from a selected one of said plurality of context objects that is passed to said action unit, and invoke said function using said values as input parameters; and wherein said action method, when applied, causes said function to be invoked through the instructions in said action unit.

11. The machine readable medium of claim 10, wherein:

said second object also includes a first structure storing data identifying, for one or more of said set of input parameters, the corresponding key and a value for that input parameter; and said instructions of said action unit, when executed by a processor, also cause that processor to access values for one or more of said set of input parameters from said first structure.

12. The machine readable medium of claim 11, wherein:

said instructions of said action unit, when executed by a processor, also cause that processor to access values for one or more of said set of input parameters from said default context object.

13. The machine readable medium of claim 11, wherein:

said instructions of said action unit, when executed by a processor, also cause that processor to access values for one or more of said set of input parameters from said default context object.

14. The machine readable medium of claim 7 further having stored thereon:

said second object also includes a first structure to store data identifying, for one or more of said set of input parameters, the corresponding key and a value for that input parameter; and an action unit including instructions, which when executed by a processor, cause that processor to, access values for said set of input parameters from said first structure of said second object, a selected one of said plurality of context objects that is passed to said action unit, and said default context object, and invoke said function using said values as input parameters.

15. A machine readable medium having stored thereon:

a plurality of functions for one or more applications, each of said plurality of functions requiring one or more input parameters, the input parameters required by said plurality of functions collectively defining a set of parameter kinds irrespective of data type, each parameter kind in said set being assigned a unique key;

a metadata object corresponding to each of said plurality of functions, each said metadata object storing data to locate the corresponding one of said plurality of functions, each said metadata object also storing the unique key for each input parameter required by the corresponding one of said plurality of functions; and each metadata object having one or more corresponding execution objects, each execution object including a structure storing data to identify a value for each input parameter of the one of said plurality of functions identified by the corresponding metadata object.

16. The machine readable medium of claim 15, wherein each parameter of said plurality of functions is of one of a plurality of data types each supporting a range of values, wherein different data is categorized irrespective of data type, and wherein each category of data defines one of the parameter kinds.

17. The machine readable medium of claim 15 further having stored thereon:

an action unit for each of said plurality of functions, each of said action units including instructions, which when executed by a processor, cause that processor to invoke the corresponding one of said plurality of functions; and wherein the data in each of said metadata objects for locating the corresponding one of said plurality of functions identifies the corresponding one of said action units; and wherein each of said metadata objects includes an action method, which when applied, causes the execution of the instructions in the corresponding one of said action units.

18. The machine readable medium of claim 17, wherein:

each execution object includes a method, which when applied, causes said action method of the corresponding metadata object to be applied for that business rule;

each action method, when applied responsive to the method of an execution object, causes the instructions in the corresponding action unit to be executed for that business rule; and the instructions in each action unit, when applied responsive to an action method responsive to the method of an execution object, causes the values of that business rule to be accessed and said function of that action unit to be invoked with said values as input parameters.

19. The machine readable medium of claim 15, wherein at least one of said execution objects stores the key and a corresponding value for at least one input parameter of the corresponding one of said plurality of functions.

20. The machine readable medium of claim 15, wherein:

at least one of said execution objects includes a structure identifying a manager object; and said manager object includes a structure to store the key and a corresponding value for at least on input parameter of the one of said plurality of functions corresponding to the at least one of said execution objects.

21. The machine readable medium of claim 15, wherein:

at least one of said execution objects includes a structure identifying a manager object; and said manager object includes, a first structure to store a plurality of context objects, each of said plurality of context objects to store the key and a corresponding value for one or more input parameters to at least certain of the plurality of functions, and a second structure to store data identifying one of said plurality of context objects as a default context object.

22. The machine readable medium of claim 15, wherein:

each of said plurality of functions provides one or more output parameters, the input and output parameters of said plurality of functions collectively defining said set of parameter kinds irrespective of data type;

each said metadata object also storing the unique key for each input and output parameter of the corresponding one of said plurality of functions.

23. A machine readable medium having stored thereon sequences of instructions, which when executed by a set of one or more processors, cause said set of one or more processors to perform the acts of:

applying a first method from a first execution object, said first execution object identifying a first metadata object corresponding to a first function, said first function requiring one or more input parameters, said first metadata object storing data describing each input parameter of said first function, said first method causing the acts of, accessing the data describing each input parameter of said first function from said first metadata object;

attempting to match values associated with said first execution object to each input parameter of said first function as described by the data; and determining a value is missing for at least a first input parameter to said first function.

24. The machine readable medium of claim 23, wherein said first method further causes the acts of:

locating a second metadata object corresponding to a second function having one or more output parameters, said second metadata object storing data describing each output parameter of said second function;

determining the missing first input parameter is an output parameter of said second function; and executing said second function to acquire the missing value.

25. The machine readable medium of claim 24, wherein said first method further causes the act of:

associating the acquired value with said first execution object; and executing said first function using the acquired value now associated with said first execution object as the first input parameter.

26. The machine readable medium of claim 23, wherein said first method further causes the acts of:

determining a set of metadata objects that each have stored therein data describing an output parameter that matches one or more of the missing input parameters, wherein each metadata object in said set corresponds to a different function having a set of one or more output parameters, each metadata object in said set storing data describing said set of output parameters for the corresponding function; and executing the functions corresponding to the set of metadata objects to acquire said set of missing values;

associating the acquired values with the first execution object; and executing said first function using the values associated with the first execution object as input parameters.

27. The machine readable medium of claim 23, wherein said attempting further includes:

accessing a structure in said first execution object, said structure in said first execution object to store values for one or more said set of input parameters to said first function.

28. The machine readable medium of claim 23, wherein said attempting further includes:

accessing a structure in a manager object identified by a structure in said first execution object, said structure in said manager object identifying a default one of a plurality of context objects, each of said plurality of context objects to store values for one or more of the input parameters to said first function; and accessing said values from said default context object.

29. The machine readable medium of claim 23, wherein said sequences of instructions, when executed, cause said set of processors to further perform the acts of:

applying a first method from a second execution object, said second execution object also identifying said first metadata object, said first method of said second execution object causing the acts of, accessing the data describing each input parameter of said first function from said first metadata object;

attempting to match values associated with said second execution object to each input parameter of said first function as described by the data in said first metadata object; and determining one or more values are missing for at least certain input parameters of said first function.

30. A machine readable medium having stored thereon sequences of instructions, which when executed by a set of one or more processors, cause said set of one or more processors to perform the acts of:

applying a first method from a first execution object, said first execution object identifying a first of a plurality of metadata objects, each of said plurality of metadata objects identifying a different function, each of said functions having input and output parameters, wherein one or more parameters for different functions are the same, the parameters for the different functions collectively defining a set of parameter kinds, each parameter kind in said set of parameter kinds being assigned a unique key, each of said plurality of metadata objects storing the unique keys assigned the input and output parameters of the function they identify, said first method causing the acts of, accessing the key for each input parameter stored in said first metadata object;

attempting to match parameter values associated with said first execution object to each of the accessed keys; and determining parameter values are missing for a set including at least one of the accessed keys.

31. The machine readable medium of claim 30, wherein each parameter of said functions is of one of a plurality of data types each supporting a range of values, wherein different data is categorized irrespective of data type, and wherein each category of data defines one of the set of parameter kinds.

32. The machine readable medium of claim 30, wherein said first method further causes the acts of:

locating a set of one or more of said plurality of metadata objects that collectively store each of the set of keys; and executing the functions corresponding to the set of metadata objects to acquire said set of missing parameter values as outputs of the functions;

associating the acquired parameter values with the first execution object; and executing the function identified by the first metadata object using the parameter values associated with the first execution object as input parameters.

33. The machine readable medium of claim 30, wherein said attempting further includes:

accessing a structure in said first execution object, said structure in said first execution object to store values for one or more said set of input parameters to the function identified by the first metadata object.

34. The machine readable medium of claim 30, wherein said attempting further includes:

accessing a structure in a manager object identified by a structure in said first execution object, said structure in said manager object identifying a default one of a plurality of context objects, each of said plurality of context objects to store values for one or more of the input parameters to said first function; and accessing one or more of said values from said default context object.

35. The machine readable medium of claim 30, wherein said sequences of instructions, when executed, cause said set of processors to further perform the acts of:

applying a first method from a second execution object, said second execution object also identifying said first metadata object, said first method of said second execution object causing the acts of, accessing the key for each input parameter stored in said first metadata object;

attempting to match values associated with said second execution object to each of the accessed keys; and determining parameter values are missing for a set including at least one of the accessed keys.

36. The machine readable medium of claim 30, wherein said attempting further includes:

accessing from a first structure in said first execution object a value for a first input parameter to said function identified by said first metadata object;

accessing, from a first of a set of context objects that was passed, a value for a second input parameter to said first function, said set of context objects being stored in a first structure of a manager object, each of said set of context objects to store values for one or more of the input parameters to said first function, said manager object identifying one of said set of context objects as a default context object; and accessing from said default context object a value for a third input parameter to said first function.

37. A machine readable medium having stored thereon sequences of instructions, which when executed by a set of one or more processors, cause said set of one or more processors to perform the acts of:

receiving a request to locate a function that provides a particular parameter kind as an output;

locating a metadata object having stored therein data identifying said particular parameter kind, said metadata object identifying a function and storing said data to indicate the particular parameter kind is an output parameter of said function; and providing an execution object that identifies said metadata object, wherein said execution object includes, structure to identify values for a set of one or more input parameters to said function, and a method, which when applied, causes said function to be invoked using the values identified by said structure as input parameters.

38. The machine readable medium of claim 37, wherein:

said function has a plurality of parameters, said metadata object stores data identifying each kind of said plurality of parameters.

39. The machine readable medium of claim 38, wherein each parameter of said function is of one of a plurality of data types each supporting a range of values, wherein different data is categorized irrespective of data type, and wherein each category of data defines one of the parameter kinds.

40. The machine readable medium of claim 37, wherein:

said metadata object includes an action method, which when applied by a processor, causes said processor to invoke said function; and said method in said execution object, when applied, causes said action method to be applied.

41. A machine readable medium having stored thereon sequences of instructions, which when executed by a set of one or more processors, cause said set of one or more processors to perform the acts of:

receiving a request to locate a function that provides a particular output parameter, wherein each of a plurality of metadata objects identify a different function having one or more output parameters, said output parameters for the different functions collectively defining a set of parameter kinds, each parameter kind in said set being assigned a unique key, each of said plurality of metadata objects storing the unique keys assigned the output parameters of the function they identify;

locating a first of said plurality of metadata objects that stores the unique key for the particular output parameter; and creating an execution object that identifies said first metadata object, wherein said execution object includes, a structure to identify values for a set of one or more input parameters to said function identified by said first metadata object, and a method, which when applied, causes said function identified by said first metadata object to be invoked using the values identified by said structure as input parameters.

42. The machine readable medium of claim 41, wherein each parameter of said functions is of one of a plurality of data types each supporting a range of values, wherein different data is categorized irrespective of data type, and wherein each category of data defines one of the parameter kinds.

43. The machine readable medium of claim 41, wherein said sequences of instructions, when executed, cause said set of processors to further perform the acts of:

applying said method from said execution object, wherein both said input and output parameters for the different functions collectively define said set of parameter kinds, each of said plurality of metadata objects storing the unique keys assigned the input and output parameters of the function they identify, said method from said execution object causing the acts of, accessing the key for each input parameter stored in said first metadata object;

attempting to match parameter values associated with said execution object to each of the accessed keys; and executing the function identified by said first metadata object using the parameter values associated with the execution object as input parameters.

44. The machine readable medium of claim 41, wherein said attempting further causes the acts of:

determining parameter values are missing for a set including at least one of the accessed keys.

locating a set of one or more of said plurality of metadata objects that collectively store each of the set of keys for output parameters; and executing the functions corresponding to the plurality of metadata objects to acquire said set of missing parameter values as outputs of the functions; and associating the acquired parameter values with first execution object.

45. A machine readable medium having stored thereon sequences of instructions, which when executed by a set of one or more processors, cause said set of one or more processors to perform the acts of:

applying a first method from a first execution object, said first execution object identifying a first of a plurality of metadata objects, each of said plurality of metadata objects identifying a different function, each of said functions having input and output parameters, wherein one or more parameters for different functions are the same, said parameters for the different functions collectively defining a set of parameter kinds, each parameter kind in said set of parameter kinds being assigned a unique key, each of said plurality of metadata objects storing the unique keys assigned the input and output parameters of the function they identify, said first method causing the acts of, accessing the key for each input parameter stored in said first metadata object;

associating with said first execution object a value stored as part of a first of a set of context objects that was passed, said value stored for use as a first input parameter, said set of context objects being stored in a first structure of a manager object, each of said set of context objects to store values for one or more of the input parameters to said first function; and executing said first function using the parameter values associated with the first execution object as input parameters.

46. The machine readable medium of claim 45, wherein said first method further causes the acts of:

associating with said first execution object a value stored as part of one of said set of context objects identified by said manager object as a default context object, said value stored for a second input parameter to said first function.

* * * * *